Feb. 17, 1959 G. R. GORDON ET AL 2,873,535
DRAFTING APPARATUS
Filed Sept. 27, 1955 8 Sheets-Sheet 1

FIG.1

INVENTORS.
GUY SAVAGE, JR.
GARLAND R. GORDON.
BY

Feb. 17, 1959 G. R. GORDON ET AL 2,873,535
DRAFTING APPARATUS
Filed Sept. 27, 1955 8 Sheets-Sheet 2
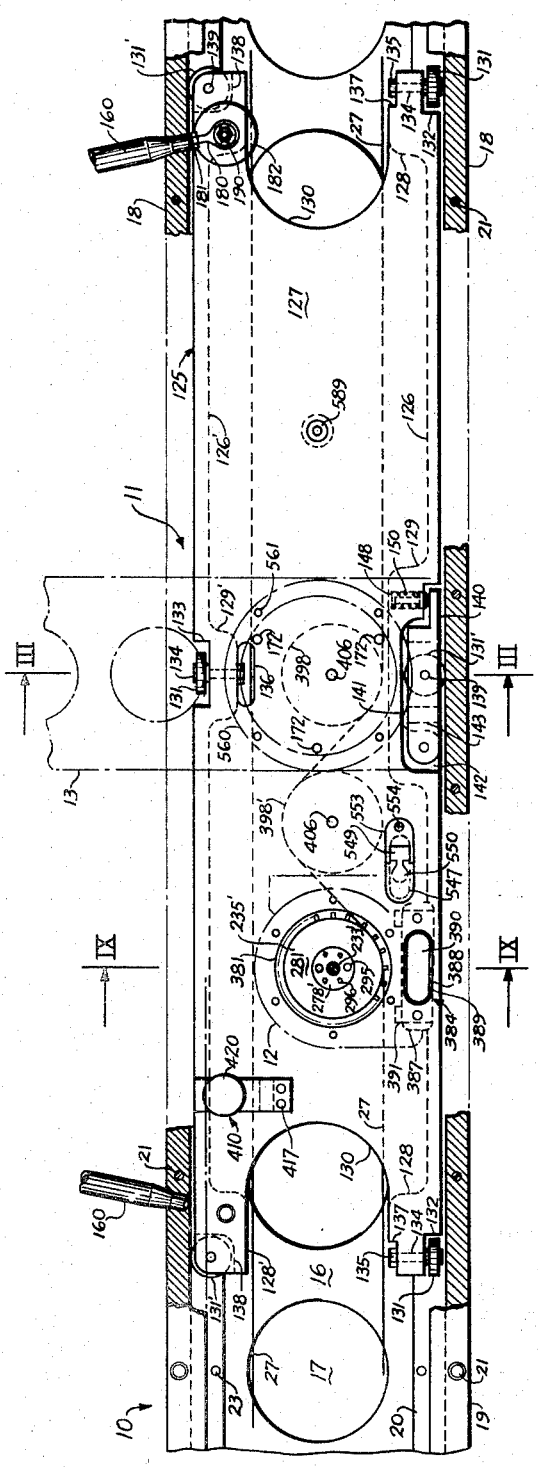
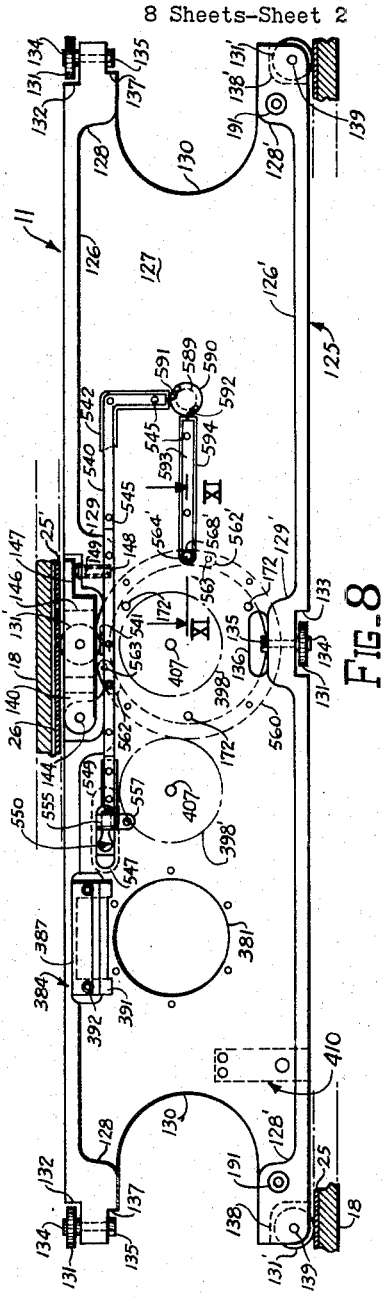
INVENTORS.
GUY SAVAGE, JR.
GARLAND R. GORDON
BY INVENTORS.
GUY SAVAGE, JR.
GARLAND R. GORDON.
BY
Walter J. Jason

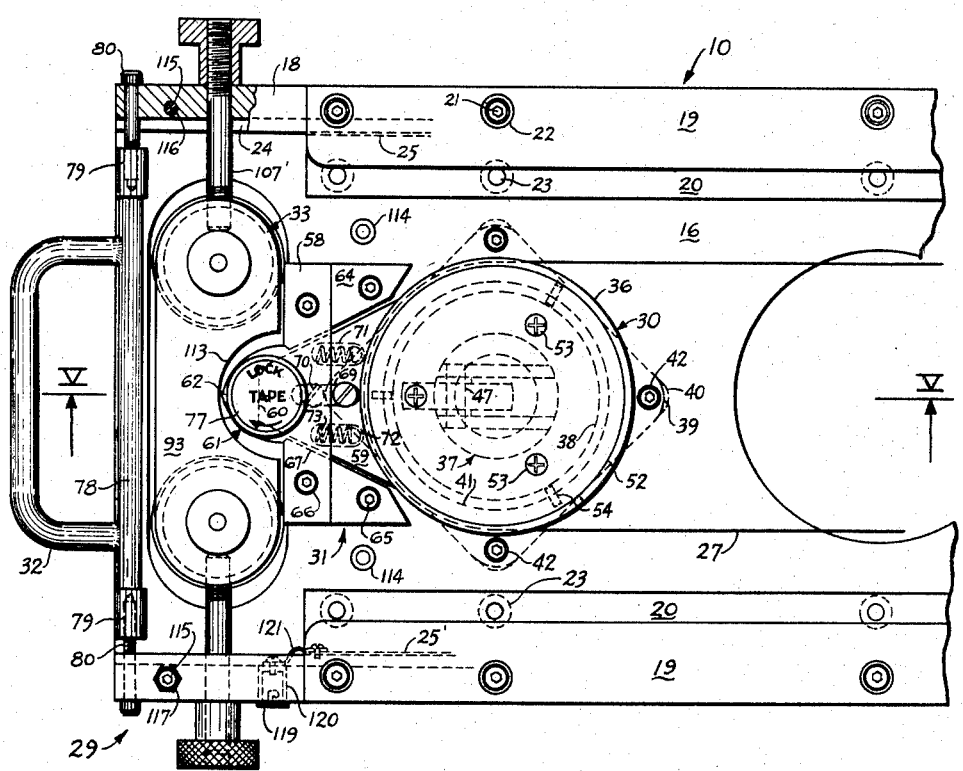

Feb. 17, 1959    G. R. GORDON ET AL    2,873,535
DRAFTING APPARATUS
Filed Sept. 27, 1955    8 Sheets-Sheet 5
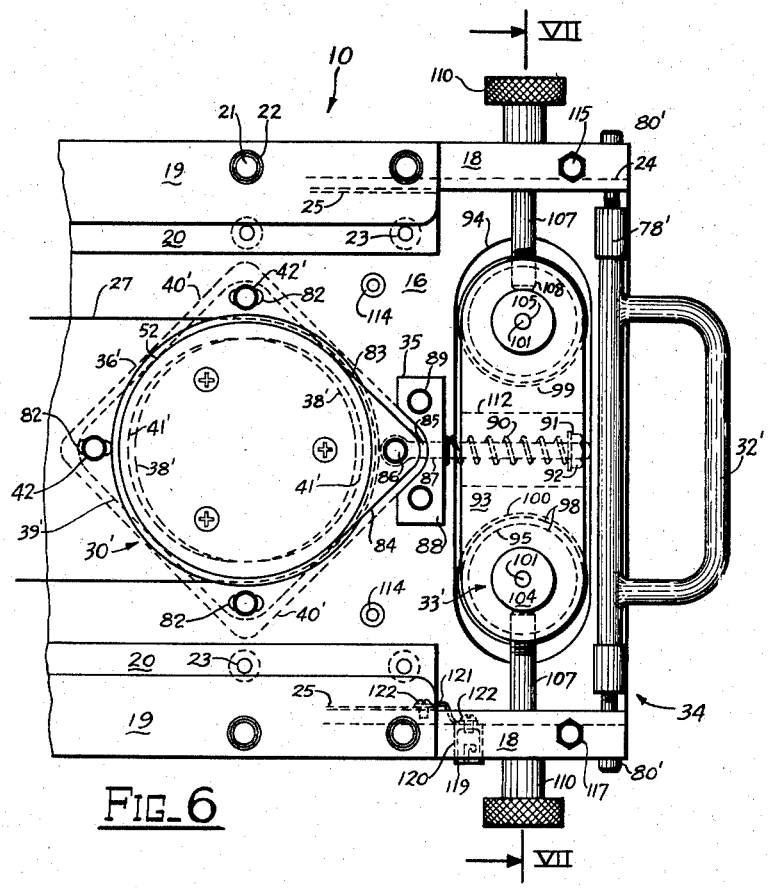
Fig_6
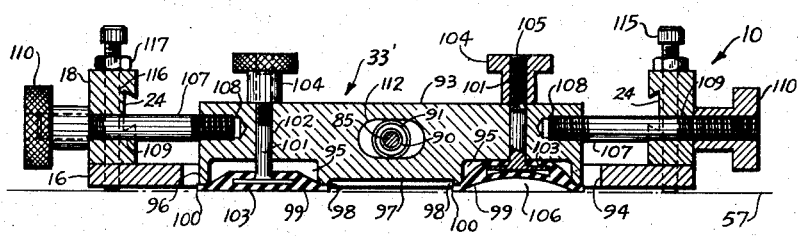
Fig_7
INVENTORS.
GUY SAVAGE, JR.
GARLAND R. GORDON.
BY

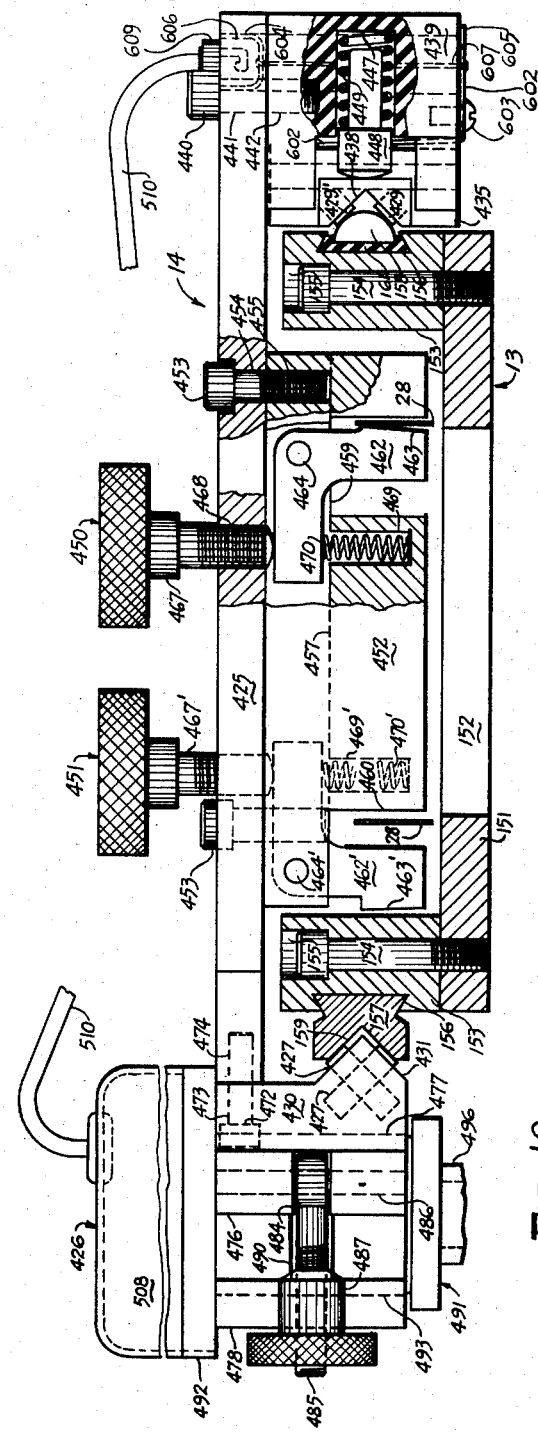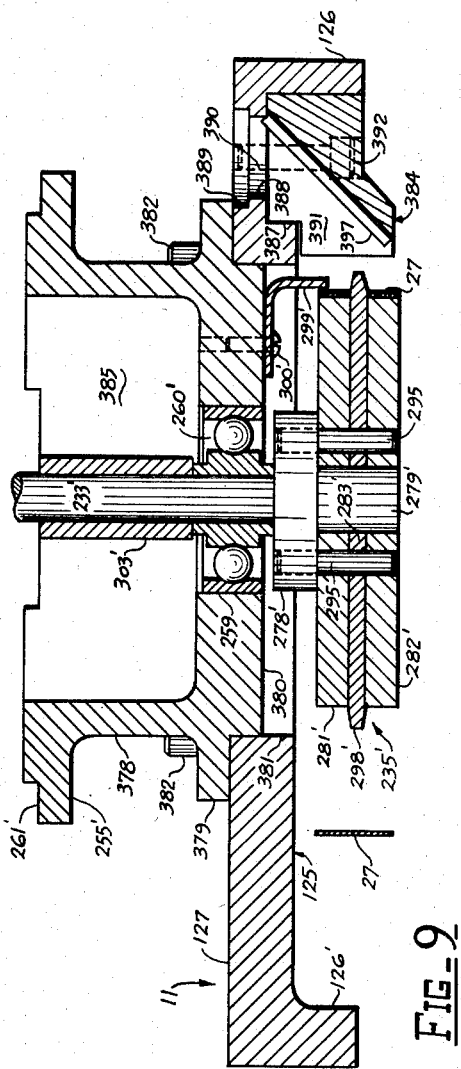
FIG_10
FIG_9
INVENTORS.
GUY SAVAGE, JR.
GARLAND R. GORDON.

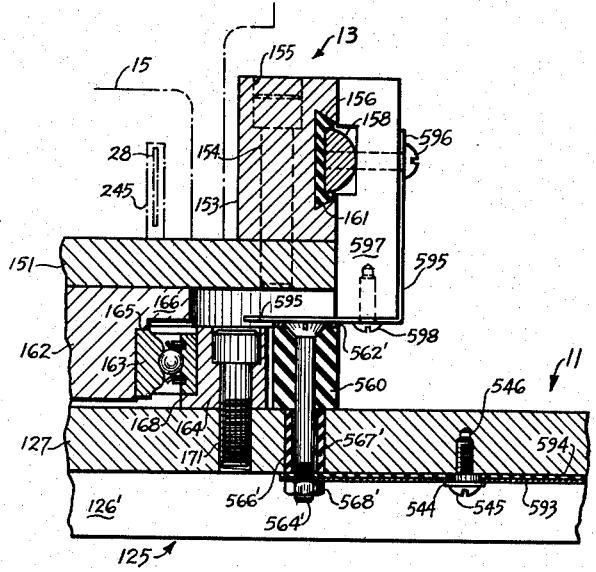
FIG_11
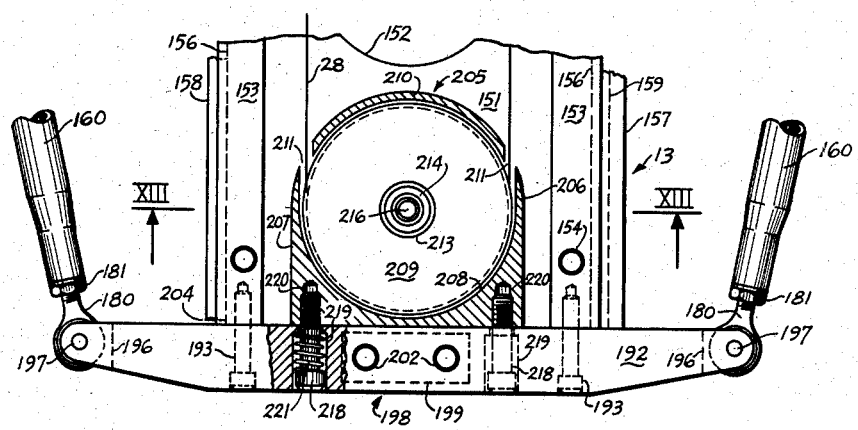
FIG_12
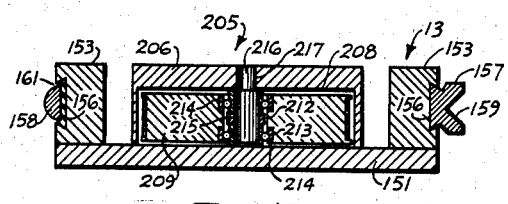
FIG_13
INVENTORS.
GUY SAVAGE, JR.
GARLAND R. GORDON.

Feb. 17, 1959
G. R. GORDON ET AL
2,873,535
DRAFTING APPARATUS
Filed Sept. 27, 1955
8 Sheets-Sheet 8
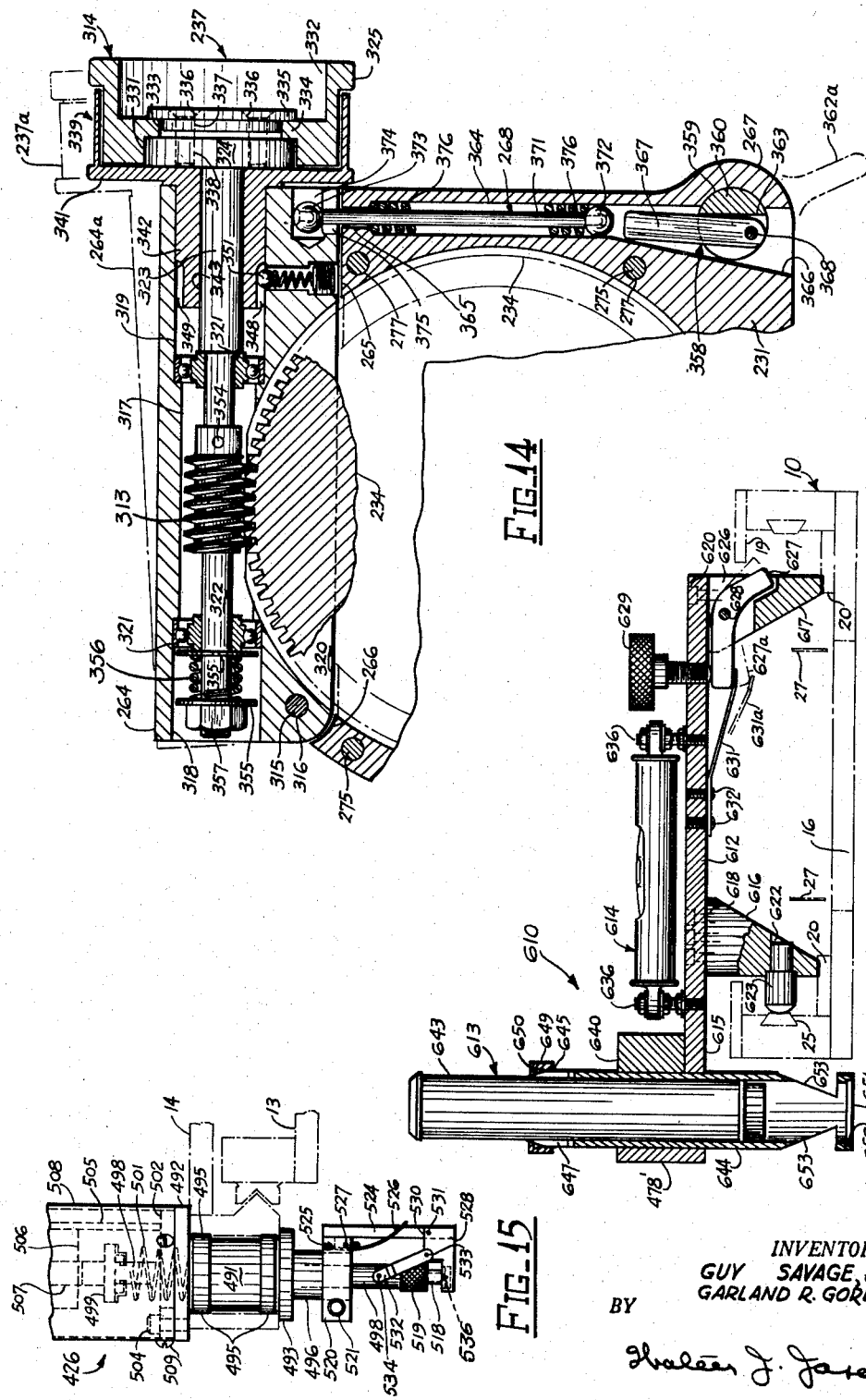
INVENTORS.
GUY SAVAGE, JR.
GARLAND R. GORDON.
BY United States Patent Office 2,873,535
Patented Feb. 17, 1959

2,873,535

DRAFTING APPARATUS

Garland R. Gordon and Guy Savage, Jr., Fort Worth, Tex., assignors to General Dynamics Corporation, San Diego, Calif., a corporation of Delaware Application September 27, 1955, Serial No. 537,081

9 Claims. (Cl. 33—189)

The present invention relates to a drafting apparatus, and more particularly to a drafting apparatus which is characterized by a plurality of carriages movable along different and predetermined axes.

It is a principal object of the present invention to provide novel drafting apparatus that is adapted for the accurate and rapid plotting and marking of coordinate points in relation to established datum lines.

Another object of the invention resides in the provision of an improved lofting machine which is adapted to convert plotted points into coordinates by measurement from given datum lines.

A further object of the invention is to provide a unique mechanical coordinate plotter of improved form which embodies a longitudinal carriage operable along a longitudinal track, and a transverse carriage operable along a transverse track, both carriages being movable along their respective tracks through the agency of tape drives.

Yet another object of the invention is the provision of a novel drafting machine which embodies a longitudinal track assembly, and a transverse track assembly adapted to be pivoted into a longitudinally extending position.

A further object of the invention is to provide an improved coordinate plotter which embodies integral electrical circuits to minimize electrical wiring.

Another object of the present invention is to provide an improved drafting apparatus which is comparatively simple and efficient, and which is adapted for convenient and rapid operation for plotting points or for measuring the location of predetermined points.

Other objects and features of the present invention will be readily apparent to those skilled in the art from the following specification and appended drawings wherein is illustrated in a preferred form of the invention, and in which:

Figure 1 is a perspective view of an embodiment of the lofting machine of the present invention;

Figure 2 is a plan view of the longitudinal or primary carriage, shown in position upon the middle portion of the longitudinal track assembly;

Figure 4 is a detail plan view of the left end of the longitudinal track assembly;

Figure 5 is a detail sectional view taken along line V—V of Figure 4;

Figure 6 is a detail plan view of the right end of the longitudinal track assembly;

Figure 7 is a detail sectional view taken along line VII—VII of Figure 6;

Figure 8 is a detail plan view of the underside of the primary carriage illustrating the electrical circuit and the electrical connections to the longitudinal track, portions of which track are shown in section;

Figure 9 is a detail sectional view taken along line IX—IX of Figure 2;

Figure 10 is a detail sectional view of the transverse track taken along line X—X of Figure 1;

Figure 11 is a fragmentary detail sectional view taken along line XI—XI of Figure 8, particularly illustrating the method employed for transmitting electrical energy from the primary carriage to the transverse track assembly;

Figure 12 is a plan view, partially in section, of the outer end of the transverse track assembly;

Figure 13 is a detail sectional view taken along line XIII—XIII of Figure 12;

Figure 14 is a detail sectional plan view taken along line XIV—XIV of Figure 3;

Figure 15 is an elevational view of the solenoid-operated centerpunch mechanism; and Figure 16 is a detail sectional elevational view of the alignment and leveling accessory.

Figure 3:
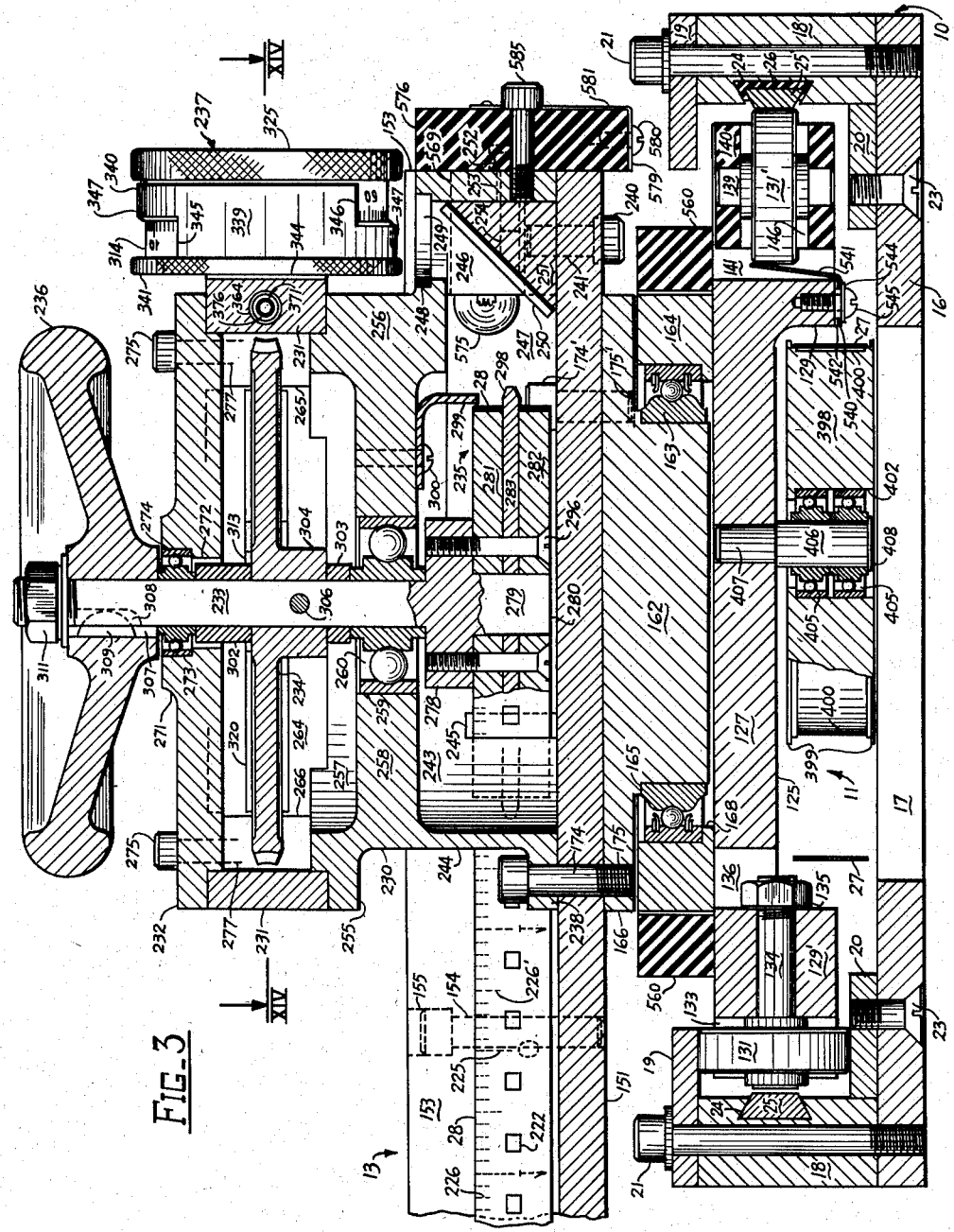
Figure 3 is a detail sectional view taken along line III—III of Figure 2.

Referring now to Figure 1 of the drawings, the lofting machine of the present invention comprises the following principal component assemblies: a longitudinal or main track assembly 10; a longitudinal or primary carriage assembly 11; a longitudinal control assembly 12; a transverse or secondary track assembly 13; a transverse or secondary carriage assembly 14; and a transverse control assembly 15.

Primary carriage assembly 11 is movable on main track assembly 10 and is adapted to transport bodily, transverse track assembly 13; secondary carriage assembly 14, and control assemblies 12 and 15 longitudinally along main track assembly 10, with longitudinal control assembly 12 serving to very accurately control the movements of primary carriage assembly 11. Secondary carriage 14 is adapted to travel along transverse track assembly 13, its movement being precisely controlled by transverse control assembly 15. With this arrangement, longitudinal track assembly 10, primary carriage assembly 11, and longitudinal control assembly 12 cooperate to locate the abscissa of a point, while transverse track assembly 13, secondary carriage assembly 14, and transverse control assembly 15 cooperate to locate the ordinate of such a point, so that any point in a conventional coordinate system may be readily plotted by the present device, as will be more particularly described hereinafter.

Longitudinal track assembly 10, as best shown in Figures 2 and 3, comprises a base plate 16 which is lightened by a series of holes 17, a pair of parallel, longitudinally extending side rails 18, a pair of parallel upper ways 19, and a pair of parallel lower ways 20. Upper ways 19 extend substantially coextensive with rails 18 and are secured to the upper surface of rails 18 by cap screws 21 which also secure rails 18 to base plate 16. Lower ways 20 also extend substantially coextensive with rails 18 and are secured to base plate 16 by any suitable means, such as with machine screws 23. Upper and lower ways 19 and 20 are located in spaced and parallel relationship to each other, with the lower surfaces of upper ways 19 being disposed in co-planar relation, and the upper surfaces of the lower ways 20 likewise being disposed in co-planar relation.

The inwardly disposed faces of side rails 18 are vertical, are parallel to each other, and each embodies a longitudinal groove 24 along its entire length, grooves 24 serving to receive a pair of longitudinally extending side ways 25 and 25'. Side way 25 is preferably made of hardened steel and swaged in place to provide securement and also to provide a grounded electrical contact with its side rail 18, as will be discussed hereinafter. Side way 25', which is adapted to fit within the other of grooves 24, is fabricated of an electrically conductive material, such as brass, and is bonded in position between a dielectric material 26, such as Fiberglas, and rail 18 so that way 25' is completely electrically insulated from side rail 18. Side ways 25 and 25' are arranged in parallel relationship to each other and the inner or wearing surface of way 25' is made as straight as possible since its accuracy will determine in large part the accuracy of the complete lofting machine. Thus, side ways 25 and 25', and upper and lower ways 19 and 20, define an accurate longitudinal runway or path of travel for primary carriage assembly 11.

The construction of the ends of longitudinal track assembly 10 is partially dictated by the means employed in the present invention to drive carriage assembly 11 along track assembly 10, these means including an endless driving or measuring tape 27 as will be more particularly described later. The end construction 29 of the left end of track assembly 10 is best illustrated in Figures 4 and 5, and comprises a retractable swivel caster and housing assembly 30, a tape locking mechanism 31, a carrying handle 32, and a transverse adjustment and temporary hold-down mechanism 33. Similarly, end construction 34 of the right end, as best illustrated in Figures 6 and 7, comprises a retractable swivel caster and housing assembly 30', a carrying handle 32', a transverse adjustment and temporary hold-down mechanism 33' and a longitudinal tape tensioning mechanism 35. Assemblies 30 and 30' serve to limit travel of primary carriage assembly 11, and serve to provide, respectively, axles for tape pulleys 36, and 36', and as housings for swivel caster assemblies 37 and 37'.

Housing assembly 30 at the left end of the lofting machine includes a vertically disposed tubular element 38, Figures 4 and 5, which embodies an integral peripheral flange 39 at its lower extremity. Flange 39 is adapted to fit snugly within a mating recess 40 in the lower surface of base plate 16 so that housing assembly 30, which extends upwardly through an opening 41 in base plate 16, may be attached to base plate 16 by any conventional means, as with bolts or cap screws 42. Disposed about tubular element 38 is a tape pulley 36 which is mounted upon a roller bearing 43 which is in turn mounted upon tubular element 38 so that pulley 36 is freely rotatable about element 38. Pulley 36 is essentially a thin ring having a shallow peripheral channel or track thereabout within which tape 27 rides.

Within tubular element 38 is fitted the swivel caster assembly 37, which comprises a ball bearing 44 which carries a tire 45 having preferably a phenolic-laminate tractive surface to avoid marring the work or the drawing sheet. Bearing 44 is carried between the legs of a caster fork 46 by a pin or axle 47, and an element 48 of fork 46 is press-fitted into the bore of a ball bearing 49, which in turn is press-fitted into suitable opening in a disk 50 so that assembly 37 is adapted to rotate through a full 360 degrees. A circular recess 51 is provided in the lower surface of disk 50 to facilitate such rotation by providing clearance between the upper portion of the caster fork 46 and disk 50. Disk 50 is adapted for rotation within the upper portion of tubular element 38 by the manipulation of a knob 52 to which it is fixed by machine screws 53. Knob 52 in turn is adapted to rotate about the upper end of tubular element 38, and is provided with a plurality of horizontal disposed and radially arranged pins 54, which are press fitted within mating openings in the skirt wall of knob 52 and which pins 54 extend inwardly for sliding engagement with the defining edges of a plurality of helical slots 55 provided in the upper wall portion of tubular element 38. This pin and slot arrangement is conventional and serves as a means for enabling raising or lowering caster assembly 37 by operation or rotation of knob 52. More specifically, rotation of knob 52 in a clockwise direction forces pins 54 to act against and ride downwardly upon the edges of slots 55, moving assembly 37 downwardly with respect to tubular element 38 so that end 29 of the lofting machine is raised above the loft surface, designated 57. In this raised position, the present machine may be moved over surface 57. In a related manner, lowering of end 29 of the machine is effected by rotating knob 52 in the opposite or counterclockwise direction so that the machine is made to rest upon lofting surface 57.

Tape locking mechanism 31, which serves to lock tape 27 at any desired position, comprises a frame 58, a brake block 59, a wedge-shaped cam 60 and an actuating screw 61. Frame 58 is mounted on the upper surface of base plate 16, and embodies at its left end an integral portion 62 which is provided with a slot 63, Figure 5, for receiving cam 60 in vertically slidable relation. The transversely disposed ends of frame 58 embody integral and inwardly disposed feet 64 which are attached to base plate 16 in a conventional manner, such as with cap screws 65, to secure frame 58 in position. A plurality of cap screws 66 assist in securing frame 58 to base plate 16, as illustrated. The inner faces of feet 64 are slanted to accept the mating and slanted faces of wedge-shaped brake block 59 so that block 59 is disposed between feet 64 in position for urging against tape 27, as will be seen.

Brake block 59 is fabricated of a phenolic-laminate material, such as Micarta, to minimize the possibility of marring the face of tape 27 during braking thereof and also to provide a good braking surface to preclude slippage of tape 27 during a braking operation. The face of brake block 59 opposite its braking face is slanted so as to be engageable with the slanted face of cam 60. In addition, the lower edge of the braking face of block 59 is provided with a groove 68 into which projects the lower flange of tape pulley 36 to restrain pulley 36 against vertical movement and to insure that the braking face of block 59 will bear only against tape 27 and not on the flange of tape pulley 36.

Brake block 59 is longitudinally slidable along base plate 16, and is provided with a central slot 69 through which are disposed a pair of shoulder screws 70, one of screws 70 being secured to base plate 16, while the other screw 70 is adapted to be secured to flange 39 of tubular element 38. Slot 69 and shoulder screws 70, work together to guide brake block 59 in slidable travel, and the heads of screws 70 serve to restrain block 59 against vertical movement. Within recesses 71 provided in block 59 on either side are housed return means or springs 73 operative on brake block 59 for movement thereof when block 59 is not in its locked or braking position. These springs 73 are adapted to act against the walls of recesses 71 and against pins (not shown) which are secured to base plate 16 so that brake block 59 is spring loaded or biased away from a locked position into engagement with the inner faces of feet 64.

Wedge-shaped cam 60 is operated by actuating screw 61, a threaded portion 74 of screw 61 being adapted to engage an internally threaded aperture 75 provided in portion 62 of frame 58 so that clockwise rotation of screw 61 forces the lower end of screw 61 against cam 60. Screw 61 is preferably rotatably secured to cam 60 by any suitable means so that upon counterclockwise rotation of screw 61 cam 60 will move upwardly with screw 61. These suitable means may be a pair of small pins 76 horizontally and longitudinally disposed within cam 60 and cooperating with a suitable annular groove provided at the lower end of an extended portion of screw 61, which extended portion is fitted into a suitable aperture provided in cam 60. Clockwise rotation of screw 61, by operation of a knob 77, forces cam 60 downwardly and causes brake block 59 to be moved inwardly by this wedging action so that tape 27 is locked against tape pulley 36. Releasing tape 27 from this locked position is effected by rotating knob 77 in a counterclockwise direction, and springs 73 then tend to move brake block 59 away from tape 27.

Carrying handle 32 of the present lofting machine is pivotally mounted to the left end 29 of longitudinal track assembly 10, handle 32 being carried by a rod 78 which is provided with openings 79 receiving the ends of bolts 80, the bolts being threadedly attached to side rails 18.

Handle 32', mounted at the right end of the lofting machine, Figures 6 and 7, is identical. However, hold down mechanism 33' at the right end is slightly different from its counterpart mechanism 33, and these differences will now be described.

At the right end 34 of the present machine, as shown in Figure 6, a retractable swivel caster and housing assembly 30' is provided which serves to maintain a uniform tension upon tape 27 by means of spring-loaded tape tensioning mechanism 35, uniform tension in tape 27 being important for accurate functioning of the present machine, as will be seen. Assembly 30' is substantially identical to assembly 30 except for the means by which 30' is attached to base plate 16. Thus, recess 40' is similar to recess 40, but is sufficiently larger to permit assembly 30' to be shifted a somewhat greater longitudinal distance, and flange 39' of element 38' is movably secured to base plate 16 by cap screws 42' which are threaded to flange 39' and pass through longitudinally slotted apertures 82 in base plate 16. The slotted apertures 82 permit a certain degree of longitudinal movement for assembly 30', and it is also noted that aperture 41' through which tubular element 38', extends is made somewhat elongated to also permit such movement of assembly 30'.

An annular sleeve or link 83 having a projecting tab or flange 84 is adapted to sleeve over the upwardly extending tubular element 38' in close-fitting relationship therewith, link 83 being interjacent tape pulley 36' and cap-like cylindrical knob 52'. Flange 84 is located above the outwardly disposed corner of flange 39', and is provided with an opening (not shown) which is in vertical alignment with both the outwardly disposed slotted aperture 82 in base plate 16 and with the hole in flange 39' of element 38'. Located between the aperture in flange 84 of annular link 83 and aperture 82 of base plate 16 is a vertically disposed tubular portion of a T-shaped eyebolt 85, this tubular portion serving to slidably receive a connecting bolt or cap screw 86 which passes through the circular aperture in flange 84, the tubular portion of T-bolt 85, slotted aperture 82, and threadably engages the aperture of flange 39'. The tubular portion of T-bolt 85 serves to space link 83 from base plate 16 so that the lower surface of link 83 is slightly above the upper surface of the tape pulley 36' to permit rotation thereof. Link 83 in turn serves to connect tape tensioning mechanism 35 to assembly 30', and restrain tape pulley 36' from undesirable vertical motion on tubular element 38' about which pulley 36' rotates.

The shank portion of eyebolt 85 extends outwardly from the tubular portion thereof, and passes through an aperture 87 in a thrust block 88 which is secured to the upper surface of base plate 16 by bolts 89. Thrust block 88 is recessed on its inwardly disposed face to accommodate the outwardly disposed projecting flange 84 of annular link 83, and a compression spring 90 is disposed about the shaft of eyebolt 85, exerting its bias against block 88 and through eyebolt 85 by means of retaining washer 91 and nut 92. The bias of spring 90, acting through connecting bolt 86, exerts a pull upon link 83 and flange 39' of tubular element 38', drawing swivel caster and housing assembly 30' toward the right end 34 of longitudinal track assembly 10, thereby maintaining a constant and uniform tension in tape 27. Adjustment of the position of nut 92 on T-bolt 85 serves to vary the compressive force which spring 90 exerts, and thus serves to vary the tension in tape 27.

The transverse adjustment and temporary hold-down mechanism 33' for the right end construction 34 of longitudinal track assembly 10 includes a block 93 having rounded ends and adapted to movably fit within a transversely disposed slotted opening 94 which is located midway between the ends of ways 19 and 20 and the right-hand outer end of longitudinal track assembly 10, and which opening 94 is made sufficiently long to provide for adequate transverse adjustment of longitudinal track assembly 10, as will be seen. The ends of block 93 embody cylindrical recesses 95, Figure 7, which are concentric with the rounded end portions of block 93, and which define wall portions 96. The lower central portion of block 93 between recesses 95 is also recessed at 97 to form annular bearing surfaces 98 which with wall portions 96 are adapted to receive circular vacuum cups 99. The peripheral flanges 100 of cups 99 are located beneath the annular bearing surfaces 98 so that flanges 100 rest on the upper surface of loft board 57 with the major portion of the lofting machine's weight bearing against them, compressing flanges 100 and forming an air-tight relationship between the loft board surface 57 and annular flanges 100. A pair of actuating screws 101 are adapted to slidably fit within vertically disposed holes 102 in block 93 with the lower ends of actuating screws 101 being provided with integral disks 103 which are embedded in cups 99. By actuating integral knobs 104, threaded at 105 to the upper ends of screws 101, cups 99 may be actuated to form a vacuum for maintaining the lofting machine in position upon loft board 57. One of cups 99 is shown in its inoperative or flattened position, and the other of cups 99 in its operative or vacuum-holding position. To effect a vacuum, screws 101 are actuated to raise cups 99, and, peripheral flanges 100 being held against loft surface 57 by annular bearing surfaces 98, a vacuum will be created at chambers 106. Release of the vacuum is readily accomplished by actuating knobs 104 in the opposite direction. It will be apparent that the present invention is also readily adapted to be bolted or otherwise secured in a particular position upon loft board 57 if such a permanent or semi-permanent installation is desired. To this end a plurality of hardened, close-tolerance cylindrical bushings 114 may be pressed-fitted into spaced circular apertures in base plate 16, bushings 114 then being fitted onto mating close-tolerance cylindrical pins (not shown) which are suitably press-fitted into the upper surface of the loft table. In this manner, the present lofting machine may be firmly located in proper alignment upon board 57, making it unnecessary to employ mechanisms such as transverse adjustment mechanisms 33 and 33'. In addition, the present machine may be leveled on an uneven surface by a plurality of leveling screws 115 and locknuts 117, as is apparent.

To effect transverse adjustments of longitudinal track assembly 10, with transverse adjustment and temporary hold-down mechanism 33' held by cups 99, a pair of transversely disposed stud bolts 107 are threaded into openings 108 in block 93, passing freely and in close-fitting relation through opposing and aligned openings 109 located in side rails 18 at a height which will locate vacuum cups 99 slightly below the lower surface of base plate 16 when the annular bearing surfaces 98 contact flanges 100 of cups 99. A pair of knobs 110 are suitably threaded to the outer ends of stud bolts 107 so that the position of longitudinal track assembly 10 may be transversely shifted over the surface of loft board 57 by alternately loosening or unscrewing a knob 110 on one side of the longitudinal track assembly 10 and tightening or screwing in the other adjusting knob 110 on the opposite side of longitudinal track assembly 10. In this manner, small, final transverse adjustments of assembly 10 may be readily made when the lofting machine must be placed in precise position with respect to previously located points or lines on the loft board 57. Further, it is noted that block 93 is provided with a slot 112 so that during such transverse movement or adjustment, accommodation is provided for the non-moving eyebolt 85 and other portions of tape tensioning mechanism 35.

The transverse adjustment and temporary hold-down mechanism 33, Figures 4 and 5, for the left end construction 29 of longitudinal track assembly 10 is substantially similar to adjustment mechanism 33' just described, except that no clearance slot 112 is provided since it is unnecessary, although a semicylindrical recess 113 is provided in block 93' of mechanism 33 to permit transverse adjustment of track assembly 10 in either direction with respect to transverse block 93' without interfering with portion 62 of tape locking mechanism 31.

Power for the present machine, for purposes to be described, is supplied through a suitable transformer 118, Figure 1, to a bayonet-type socket 119, Figure 4, having a cylindrical shell fabricated of an electrical conductive material and an insulated center post or terminal. This bayonet-type socket 119 is adapted to be press-fitted into a mating circular aperture 120 provided in the side rail 18 which contains the insulated and longitudinally disposed side way 25', so that a grounded electrical connection is had between the shell of socket 119 and such rail 18. The insulated center post of socket 119 is then electrically connected by a lead 121 to side way 25', which as was previously mentioned, is itself electrically conductive.

Longitudinal or primary carriage assembly 11, as best illustrated in Figures 2, 3, 8 and 9, includes a frame 125 which comprises a pair of longitudinally disposed and downwardly depending vertical and parallel side flanges 126 and 126' connected by an integral web 127. The ends of web 127 embody semicircular cutouts or recesses 130 to permit primary carriage assembly 11 to travel a greater distance longitudinally, and swivel caster housing assemblies 30 and 30', by abutment against recesses 130, serve as limiting stop means for such travel.

The travel of carriage assembly 11 within longitudinal track assembly 10 is effected through the use of a plurality, preferably three each, of sealed ball bearing rollers 131 and 131'. Two vertical rollers 131 are disposed on one side of frame 125 within suitable recesses 132 provided in a pair of bosses 128 which are integral with the end portions of flange 126, and the third vertical roller 131 is disposed on the other side of frame 125 within a recess 133 of a boss 129' integral with the midportion of flange 126'. Each roller 131 is rotatably associated with frame 125 by means of a suitable axle bolt 134 which is secured in position by a retaining nut 135, a slot 136 being cut into web 127 of frame 125 at boss 129' to permit placement of nut 135 therethrough, and recesses 137 being provided in bosses 128 for the other two rollers 131. Three horizontal rollers 131' are similarly located on opposite sides of frame 125, two rollers 131' being carried in suitable recesses 138 provided in a pair of bosses 128' which are integral with the end portions of channel 126', and the third horizontal roller 131' being carried by a hinge block 140, as will be described more particularly hereinafter. Each of the rollers 131' mounted at bosses 128' is rotatably associated with frame 125 by means of suitable axle pins 139 which are press-fitted into mating apertures in bosses 128', and the third roller 131' is rotatably mounted upon an axle pin 139 which is press-fitted into suitable vertically aligned openings in a block 140.

In this manner, ball bearing rollers 131 serve to support primary carriage assembly 11 in longitudinal track assembly 10, rollers 131 bearing against and being adapted to ride on the hardened lower ways 20, which serve as tracks therefor, to provide for nearly frictionless longitudinal travel of primary carriage assembly 11. In this regard, it is noted that the hardened upper ways 19 of longitudinal track assembly 10 extend inwardly, serving as retaining strips to minimize vertical motion of primary carriage assembly 11. Thus, rollers 131 maintain the stability of carriage assembly 11 in a horizontal plane. Similarly, horizontal rollers 131' serve to maintain the transverse stability of primary carriage assembly 11, bearing against and riding upon the longitudinally disposed side ways 25 and 25'.

The spring-loaded and pivotally mounted hinge block 140 to which the center horizontally disposed roller 131' is rotatably installed serves to transmit the electrical energy from insulated side way 25' of track assembly 10 to the various electrically-operated components of the present machine. For this reason, block 140 is made of a suitable dielectric material, such as micarta, and it is mounted within a recess 141 in the outer face of the contiguous boss 129 upon a ledge or web 142 which is integral with frame 125. Block 140 is slotted at 143 so as to be freely slidable over web 142 to permit pivoting of block 140 about a hinge pin 144 which is rotatably disposed through block 140 and is press-fitted through web 142.

Hinge block 140 embodies a transverse slot 146 which is adapted to house or receive the roller 131', and locate roller 131' directly opposite insulated side way 25'. Roller 131' is rotatably mounted within slot 146 upon the axle pin 139 which is pressed into block 140. Thus, roller 131' is rotatable about pin 139, and roller 131' and block 140 are pivotable as a unit at one end about pin 144. At the other end, block 140 embodies a cut out portion which forms a step 147 in block 140, which step serves to engage an alignment button 149 which is housed within a recess 148 in boss 129. Button 149 is freely slidable within recess 148, and is biased outwardly by a spring 150 fitted within recess 148, the rounded end of button 149 then bearing against step 147, causing block 140 to pivot about hinge pin 144 until roller 131' bears against the face of insulated side way 25'. This spring-loaded arrangement compensates for variations in the spacing between the faces of side ways 25 and 25'.

As best illustrated in Figures 1, 3, and 10, transverse track assembly 13 is arranged in perpendicular relation to the longitudinal track assembly 10, and comprises a base plate 151 having lightening holes 152 therein, and a pair of vertically disposed side rails 153 which are coextensive with base plate 151. Rails 153 are mounted parallel to and in a spaced relationship with each other and are attached to base plate 151 by bolts or cap screws 154 which are disposed within counterbores 155 in the upper portions of side rails 153. The outer faces of rails 153 are provided with dovetail grooves 156 which are adapted to receive a pair of ways 157 and 158, which extend longitudinally with respect to track assembly 13, and over which assembly 14 travels. The hardened steel way 157 at the left of track assembly 13, as viewed in Figure 10, embodies at its inner face a dovetail portion adapted to rigidly mate with groove 156 in a close-fitting relationship, not only to promote precision in the present machine but also to effect good electrical contact therebetween. The opposite or outer face of way 157 embodies a V-shaped groove 159 which extends longitudinally throughout the length of way 157, the faces of groove 159 being smooth and flat since this contributes to the longitudinal accuracy of the present machine.

The way 158 on the opposite or right hand side of track assembly 13 is fabricated of an electrical conductive material such as brass so that current may be conducted from the primary carriage assembly 11 to the secondary carriage assembly 14, for purposes to be described. Way 158 is substantially coextensive with groove 156 in side rail 153, and is adapted suitably to be bonded in place in groove 156 with a dielectric material 161, such as fiberglas, interposed between groove 156 and way 158 so that way 158 is electrically insulated from rail 153. With this construction, ways 157 and 158 provide an accurate runway or path of travel for the movement of carriage assembly 14 over track assembly 13.

Transverse track assembly 13 is connected to primary carriage assembly 11 at the center of assembly 11, as best illustrated in Figures 1, 3 and 11, the connection being such that upon disconnecting a pair of stabilizing rods 160 from assembly 11, track assembly 13 may be pivoted upon track assembly 10 and folded for storage purposes. This pivotal construction is provided by a stepped cylindrical hub 162, which is attached to the underside of track assembly 13, a ball bearing 163, and a stepped or shouldered annulus 164 which is attached to the upper surface of carriage assembly 11.

Hub 162 comprises three concentric, integrally formed cylindrical portions, the lowermost portion of hub 162 being press-fitted into the bore of a ball bearing 163, the centrally disposed portion of hub 162 forming a shoulder 165 against which bearing 163 abuts, and the uppermost portion of hub 162 providing a flange 166 for the attachment of hub 162 to track assembly 13. Bearing 163 is press-fitted within annulus 164, and rests upon a flange 168 of annulus 164 to provide clearance for bearing 163 above frame 125. With this construction hub 162 is freely rotatable with respect to annulus 164 to which it is assembled. Annulus 164 is attached to frame 125 of carriage assembly 11 by a plurality of bolts or screws 171, and hub 162 is attached to plate 151 of track assembly 13 by bolts or screws 174 and 174' which are threaded to flange 166 of hub 162 within openings 175 and 175'.

The normal or operative fixed relationship between transverse track assembly 13 and primary carriage assembly 11 is provided by stabilizing rods 160, which are best illustrated in Figures 1 and 2, each rod 160 being threadably connected at one end to assembly 13 and at the other end to assembly 11. Each rod 160 is provided with a self-aligning rod end ball bearing assembly 180 which is threaded into one end of rod 160 and fixed in position by a locknut 181. It is noted that the threaded connection of bearing 180 at one end of each rod 160 is characterized by threads running in a direction opposite to the threaded connection at the other end of such rod 160. By this construction rods 160 serve as turnbuckles to adjust the perpendicularity of assemblies 11 and 13. Each bearing 180 of rod 160 is pivotally attached to a rigid post 190 which is in turn threadably secured to boss 128' of frame 125. Post 190 is provided with an integral hand wheel 182 which may be rotated to secure post 190 in position within a suitable opening in boss 128' so that a predetermined accurate and precision relationship is established between assemblies 11 and 13.

The construction of the outer ends of transverse track assembly 13, and the manner of attachment of the stabilizing rods 160 thereto, Figure 12, will next be described. The outwardly disposed end of transverse track assembly 13 terminates in a crossbar 192, to which the outer ends of stabilizing rods 160 are pivotally attached. Crossbar 192 is sufficiently thick to provide a rigid construction, and is securely attached to track assembly 13 by a pair of horizontally disposed bolts or cap screws 193 which are threadably secured to the outer ends of rails 153. In addition, a dowel pin (not shown) may be located directly below and parallel to each cap screw 193 and press-fitted through openings in crossbar 192 and rails 153 to insure that the relative disposition between rails 153 and crossbar 192 is accurately maintained. At the outer end of each rod 160 is secured a self-aligning rod end ball bearing 180 which is fitted within a horizontal slot 196 cut into each end of crossbar 192. Bearing 180 and slot 196 closely mate to minimize relative vertical movement, and slots 196 are disposed opposite each other in the same horizontal plane. Pivotal attachment of rods 160 to crossbar 192 is effected through the employment of vertically disposed pins 197 press-fitted through suitable openings in crossbar 192 and in bearings 180. Such close-fitting relationship serves to minimize relative horizontal movement between ball bearings 180 and crossbar 192.

The outward end of track assembly 13 is supported above loft surface 57 by a conventional non-swiveling caster assembly 198 which is secured to crossbar 192 by a pair of cap screws 202 threaded to the usual caster frame 199 of caster assembly 198. The construction of caster assembly 198 is identical to the caster assembly 37 previously described except that caster asssembly 198 is arranged to roll parallel to longitudinal track assembly 10. It is noted that the overall height of the caster assembly 198 is such that with swivel caster assemblies 37 in their retracted position, transverse track assembly 13 will be essentially parallel throughout its entire length to loft board surface 57. It is further noted that crossbar 192 is electrically insulated from track assembly 13 by the termination at 204 of way 158, and the continuation of dielectric material 161, Figure 13, around the end of said way 158.

A spring-loaded tape tensioning mechanism 205, as shown in Figure 12, is provided at the outer end of crossbar 192, and serves to rotatably carry tape 28. Mechanism 205 includes a cylindrical tape pulley housing 206 which embodies an integral outwardly extending portion 207 by which mechanism 205 is attached to crossbar 192. Housing 206 rests on the upper surface of base plate 151 of assembly 13, and embodies a cylindrical recess 208 which is adapted to surround a tape pulley 209 and permit free rotation of pulley 209 therein without appreciable vertical movement of pulley 209. A wall section 210 defined by recess 208 is provided with a pair of slots 211 to permit the passage of tape 28 therethrough into recess 208.

Tape pulley 209 is cylindrical in shape and, as shown in Figure 13, embodies annular vertically spaced ridges or flanges which serve to maintain tape 28 in operative position. Within suitable recesses 213 on either side of an aperture 212 in the center of pulley 209 are press-fitted ball bearings 214 which are spaced apart by a bushing 215 which is disposed within aperture 212. The outer hubs of the upper and lower bearings 214 extend above and below the upper and lower surfaces, respectively, of pulley 209 to space pulley 209 from base plate 151 and housing 206. A pin 216 serves as an axle for pulley 209, and is press-fitted at one end into an aperture 217 in the upper portion of housing 206, and at its other end pin 216 is spaced slightly above the upper surface of base plate 151 of track assembly 13. Pulley housing 206 is secured to crossbar 192 by a spring-loaded attachment effected through the employment of a pair of horizontally and inwardly disposed cap screws 218 (Figure 12). The heads of screws 218 are adapted to slidably fit within apertures 219 in crossbar 192, the threaded portions of screws 218 passing through apertures 219 and engaging recesses 220 of housing 206. A spring 221 is disposed about each cap screw 218 and exerts its bias against the head of screw 218 and the bottom or stepped portion of aperture 219. Screws 218 draw pulley housing 206 toward crossbar 192 and maintain tape 28 in a uniformly taut condition. Adjustment of the tension in tape 28 is provided by screwing or unscrewing cap screws 218.

Tapes 27 and 28, which serve to drive the carriage assemblies 11 and 14, and precisely measure the travel thereof, are identical metal tapes except for length, and each embodies, Figure 3, a series of rectangular perforations 222 equally spaced from the edges of the tape 27 or 28. The horizontal centerlines of perforations 222 precisely coincide with the centerlines of tapes 27 and 28, and the horizontal sides of perforations 222 are parallel to the centerline of the tape. Accuracy of size and spacing of perforations 222 is determinative of the accuracy of the lofting machine. Each of tapes 27 and 28 is welded together at its ends into an endless band which serves, in the case of tape 27, as a rack along which carriage 11 travels, and, in the case of tape 28, as a belt which is locked to carriage 14, as will be hereinafter further described in greater detail. From a zero point 225, the tape 27 or 28 is graduated in both directions in measured intervals, such as one-tenth inch intervals 226 and 226' in the present embodiment, so that each band of tape 27 and 28 includes a scale which can be read from right to left and from left to right. Since tapes 27 and 28 are adapted to be read in mirrors, as will be seen, the numbers printed on the tapes are in backward position.

Transverse control assembly 15, Figures 3, 11 and 14, to which the inwardly disposed end of tape 28 is connected, is fixedly attached at the inward end of track assembly 13 to base plate 151. Assembly 15 comprises a base 230, a frame 231, and a cover plate 232, a centrally disposed control shaft 233, worm gear 234, and a sprocket assembly 235. As will be described, sprocket assembly 235 may be operated by a handwheel 236, or by a vernier assembly 237. Assembly 15 is located equidistant between side rails 153 of transverse track assembly 13, and at the inward end of track assembly 13, as shown in Figure 1. Base 230 of control assembly 15, Figure 3, is suitably secured to track assembly 13 by a cap screw 174 passing through an integral flange 238 into base 151 and by a pair of cap screws 240 disposed upwardly through apertures 241 in base plate 151 and threaded into the bottom surface of base 230. Base 230 includes a recess or chamber 243 and a chamber 247 which is a continuation of chamber 243. Chamber 243 houses the lower end of control shaft 233 and sprocket assembly 235 to which is attached transverse tape 28, tape 28 passing through suitable slots 245 provided in a wall section 244 which surrounds recess 243. Chamber 247 is adapted to house viewing and illuminating means which enable tape 28 to be read by the operator of the present lofting machine.

Chamber 247 communicates with an aperture 248 which extends upwardly through base 230 and serves to receive a thin glass plate 249, which acts as a window through which the operator may view tape 28; glass plate 249 is preferably cemented in position to preclude the admission of foreign matter to the interior of transverse control unit 15. Chamber 247 houses a mirror assembly which includes an angularly disposed mirror 250 and a beveled mounting block 251. Mirror 250 is cemented to block 251 and serves to reflect the image of tape 28 upwardly through window 249 to the operator. Block 251 is secured to base 230 by a pair of horizontally disposed screws 252, one of which is illustrated in Figure 3, which pass through apertures 253 in base 230 and engage mating threaded openings 254 in block 251.

The upper portion of base 230 is substantially cylindrical, terminating in an integral peripheral flange 255 which is thickened at the rear to form a heavier section 256, and which includes a shallow cylindrical recess 257 separated from recess 243 by a comparatively thick web 258. Into a central aperture 259 in web 258 is press-fitted a ball bearing 260 which serves as the lower support for control shaft 233. Frame 231 is supported between flange 255 and cover plate 232, these components serving to define an inner area within which worm gear 234 operates, and within which a hinged block housing 264 for the vernier mechanism 237 is disposed.

Frame 231, as shown in Figure 14, is open on its right-hand side where hinged block housing 264 is located, and at this open side embodies a rearward face 265 and a forward curved face 266 to match the mating contours of hinged block housing 264. The lower right hand corner of frame 231 is provided with a semicylindrical protuberance 267 which is adapted to house a release mechanism 268, which permits block housing 264 to be laterally or pivotally displaced to effect engagement or disengagement of vernier mechanism 237 with worm gear 234.

Cover plate 232, Figure 3, serves to support the upper end of control shaft 233, and also serves to enclose worm gear 234 within frame 231. Plate 232 embodies an integral and central boss 271, and is bored at 272 and counterbored at 273, counterbore 273 serving to receive a ball bearing 274 which is press-fitted in position and serves as the upper support for control shaft 233. Plate 232 and frame 231 are secured to base 230 by a plurality of bolts or cap screws 275 which pass through suitable holes in plate 232, through holes 277 in frame 231, and then threadably engage suitable openings (not shown) in the peripheral flange 255 of base 230. It is noted that precision assembly of these various components is desirable to produce precise vertical alignment of bearings 274 and 260, and prevent any appreciable horizontal movement of frame 231 and plate 232.

Control shaft 233, which serves to accept rotary motion of a handwheel 236 and transmit such motion to tape 28, comprises three integral and cylindrical portions, the upper portion extending from handwheel 236 to the lower surface of the hub of ball bearing 260 and serving to carry bearings 260 and 274 which are press-fitted in position. Collar portion 278 of shaft 233 is disposed within the upper portion of recess 243 so that sprocket assembly 235 may be attached to shaft 233, such collar portion also serving to vertically locate shaft 233 in position. Further, the lower portion or hub 279 of shaft 233 serves to locate sprocket assembly 235 in position. Adequate clearance space 280 is provided between hub 279 and base plate 151 of transverse track assembly 13 so that rotational freedom of assembly 235 and shaft 233 is afforded.

Sprocket assembly 235, Figures 2, 3 and 9, comprises a pair of circular plates or disks 281 and 282 between which is mounted toothed sprocket 283, it being noted that the outer diameter of disks 281 and 282 is calculated for some desired movement of tape 28 so that, in the present embodiment for example, one revolution of sprocket assembly 235 causes tape 28 to move ten inches. The diameter "D" of disks 281 and 282 may be calculated by the following formula, wherein "$t$" is the thickness of tape 27 or 28:

$$D = \frac{10.000}{\pi} - t$$

Disks 281 and 282 and sprocket 283 are closely fitted to shaft 233, and are secured to collar 278 of shaft 233 by four threaded flat head machine screws 296, and, in addition, a plurality of dowel pins 295, Figure 9, disposed through these components may be employed to provide a precision relationship therebetween. It will be apparent that the teeth 298 of sprocket 283 are adapted to closely mate and engage perforations 222 in tape 28 without slippage of tape 28 with respect to sprocket assembly 235, about which tape 28 is disposed.

A downwardly depending pointer 299 within recess 243 of base 230 indicates the relative position of tape 28, pointer 299 being attached to the underside of web 258 by screws 300.

The mechanism for effecting movement of tape 28 includes the worm gear 234, Figure 3, having one hundred teeth, so that movement of one tooth space causes one hundredth of a revolution of sprocket 283, and hence linear movement of one-tenth of an inch of tape 28. Of course, other gear ratios are also practicable. A pair of spacer bushings 302 and 303 serve to vertically position worm gear 234 on shaft 233, and a horizontally disposed taper pin 306 is disposed through suitable openings in shaft 233 and in a hub 304 of gear 234 so that gear 234 is locked in position upon shaft 233.

Handwheel 236, which serves to operate shaft 233 with vernier mechanism 237 disengaged, is keyed to shaft 233 by conventional keyways 307 and 308, and key 309 arrangement, and a nut 311 secures handwheel 236 in position upon shaft 233.

As previously mentioned, a ten inch movement of tape 28 is effected by rotation of sprocket 283 through one revolution, and this ten inch increment is divided into one hundred equal parts by the employment of worm gear 234. That is, movement of one tooth space of worm gear 234 causes a rotation of sprocket 283 of one hundredth of one revolution, representing a tape travel of one-tenth of an inch. Such movement of one tooth space on gear 234 may be further subdivided into one hundred equal parts by employment of vernier mechanism 237. Thus, a single pitch worm 313, which is coupled to a vernier dial 314 having one hundred equally spaced graduations, is positioned to drive gear 234, so that one revolution of worm 313 causes gear 234 to revolve one tooth space. It is apparent therefore that each graduating mark on vernier dial 314 represents a movement of one-thousandth of an inch of tape 28. With this construction handwheel 236 is employed only when mechanism 237 is disengaged, as at 237a, Figure 14, for initial positioning of tape 28. Then the vernier mechanism 237 is employed, by engaging worm 313 and worm gear 234, to set coordinates to the final precise location.

Hinged block 264, as stated, serves as a housing for mechanism 237, and is pivotally mounted between base 230 and cover plate 232, block 264 being pivotable about a dowel pin 315 which is press-fitted through a vertically disposed opening 316 in the forward corner of block 264 and through suitable openings in cover plate 232 and flange 255 of base 230. Block 264, as seen in Figure 14, embodies a horizontally and longitudinally disposed circular aperture 317 communicating at its forward and rearward ends with cylindrical recesses or counterbores 318 and 319, respectively. Aperture 317, which serves to house the single pitch worm 313, connects at one side into a cylindrical recess 320 within which gear 234 rotates and which is adapted to enclose a portion of worm gear 234 for enabling entry of the teeth of worm gear 234 into the central portion of aperture 317. This permits engagement between gear 234 and a single pitch worm 313 which is housed within aperture 317. Identical ball bearings 321 are press-fitted into counterbores 318 and 319 for supporting the forwardly disposed end of a vernier or worm shaft 322 upon which worm 313 is mounted, and which serves to couple worm 313 to a vernier dial 314.

Worm shaft 322 comprises three integral portions, the right portion, as viewed in Figure 14, terminating in a disk 324 to which is attached the vernier dial 314. Dial 314, as best seen in Figure 3, includes an annular knurled flange 325 to the left of which is located a series of graduating marks which divide the circumference into one hundred equal spaces. With vernier mechanism 237 in its engaged position, as shown in Figure 14, rotation of vernier dial 314 effects rotation of worm gear 234, and hence sprocket 283, so that tape 28 is driven, dial 314 also serving to indicate to the operator of the lofting machine the position of carriage 14 or 11 to the nearest thousandth of an inch.

The forwardly disposed portion of dial 314 embodies a cylindrical recess 331 which is adapted to receive disk 324 of shaft 322. The rearwardly disposed portion of dial 314 embodies a cylindrical recess 332, recesses 331 and 332 being interconnected by an aperture 333 which defines an annular flange 334, against which vernier dial 314 is clamped by a stepped circular plate or disk 335. Disk 335 closely fits within aperture 333 and against the rearward side of flange 334, and three machine screws 336, which pass through apertures 337 in disk 335, secure disk 335 to disk 324 by engaging threaded apertures 338 in disk 324. Securement of disk 335 to disk 324 effects an urging of dial 314 against disk 324 so that dial 314 is secured to shaft 322 for integral movement therewith. In addition, with this construction dial 314 may be set to read zero or any other reading by loosening screws 336, rotating dial 314 as desired, and retightening screws 336. This will permit dial 314 to be manipulated to correspond with a reading indicated by pointer 299.

Dial 314 is rotatably encased within a revolvable dial housing or shield 339, which includes a skirt section or element 340 open at its rearward end, and a disk 341. A hub 342 which is integral with disk 341 is rotatable within counterbore 319 of block 264 in close-fitting relationship. An aperture 343 in hub 342 serves to rotatably accommodate portion 323 of shaft 322, it being noted that the fit therebetween, like the fit between counterbore 319 and hub 342, is such that only rotational freedom without lateral or vertical freedom is permitted.

Tubular element 340 of shield 339 embodies a pair of diametrically opposed windows 345 and 346, Figure 3, to permit observation of the numerals on dial 314, one window being employed for reading the numerals at one edge of dial 314 and the other window being employed for reading the numerals at the opposite edge of dial 314. An index mark 347 is provided to facilitate reading.

To permit either window 345 or 346 to be moved to operative position and be maintained in such position, a spring-loaded stop mechanism is provided. More particularly, a pair of grooves or detents 348 and 349 are provided in hub 342 and a spring biased ball 351 is urged into that one of detents 348 or 349 which is aligned with ball 351, as illustrated in Figure 14, so that upon rotating dial shield 339 one-half revolution, ball detent 351 engages the opposing groove 348 or 349 to retain dial housing 339 in desired position.

Worm 313 is disposed on shaft 322 to engage worm gear 234, worm 313 being secured to shaft 322 by a dowel pin 354 disposed through suitable openings in the hub of worm 313 and in shaft 322. The spring-loaded arrangement by which shaft 322 is secured within housing 264 includes a pair of identical washers 355, separated by a spring 356, which are fitted over the head of shaft 322 and secured in position in counterbore 318 against bearing 321 by a nut 357. Spring 356 exerts its bias to pull worm shaft 322 longitudinally, thus maintaining shaft 322 in its proper relationship to vernier mechanism 237, and preventing inadvertent rotation of dial 314.

Worm 313 may be disengaged from worm gear 234, when it is desired to operate handwheel 236 to quickly move carriage 11 or 14, by the pivotal displacement of block 264 effected by the manipulation of a crank mechanism 358 so that worm 313 and worm gear 234 become disengaged. More specifically, in a circular aperture 359 provided in protuberance 267, Figures 3 and 14, there is rotatably disposed the cylindrical body portion of a crank 360. This body portion includes a cap and crankhandle 362, Figure 1, which serves to cap the upper end of aperture 359, and also serves to provide means for operating crank mechanism 358. Crank 360 is provided with a transverse slot 363, and this slot communicates with an opening or recess 364 embodied in the rearwardly disposed portion of frame 231, and which in turn communicates with a smaller diameter recess 365. The lower portion of recess 364, as viewed in Figure 14, widens into a tapered slot 366, and a crank rod 367 is fitted therein and adapted to be moved upwardly, from the engaged position illustrated, upon manipulation of crank handle 362. This is effected through a pivotal connection of handle 362 to crank rod 367 by a crank pin 368. Pin 368 is eccentrically located on crank 360 to provide longitudinal motion of crank rod 367 upon rotation of crank 360. An operating rod 371 is adapted to slidably fit within recess 364 and aperture 365, and securely carries at its ends a pair of spherical balls 372 and 373, ball 372 being slidable within recess 364. Ball 373 is adapted to fit within a recess 374 in the corner of block 264, recess 374 communicating with the rear face of block 264 by a horizontally disposed slot 375 large enough to permit the free passage of rod 371 therethrough. With this construction, operating rod 371 may be employed for either pushing or pulling block 264 to effect disengagement or engagement respectively of worm 313 and worm gear 234. A spring 376 fitted about rod 371 exerts its bias against ball 372 to maintain worm 313 and gear 234 in engagement. Disengagement of worm 313 and worm gear 234 is effected by rotating crankhandle 362 in a clockwise manner to dash-dot outline position 362a, thereby revolving crank 360 and causing crank pin 368 to move and drive rod 367 upwardly against rod 371. This moves block 264 to dash-dot outline position 264a, Figure 14, and disengages worm 313 and worm gear 234. At the end of such movement of rod 371, crank pin 368 has passed the "dead center" position of crank 360, and the influence of spring 376 acting outwardly on rod 367 holds the upward portion of rod 367 against the lower portion of recess 364. In this manner, worm 313 and worm gear 234 are maintained in a disengaged relationship until their re-engagement is effected by counterclockwise rotation of crank handle 362. This advances crank pin 368 forward of the "dead center" position of crank 369, and spring 376 effects re-engagement of worm 313 and worm gear 234 by urging rod 371 to the left. Worm 313 will re-engage worm gear 234 at the same dial reading on the vernier 314 as at disengagement so that the dial graduations are automatically recoordinated, and the relationship of worm 313 to worm gear 234 remains coordinated.

Longitudinal control assembly 12, Figures 1, 2 and 9, which is substantially identical to transverse control unit 15 just described, is mounted on primary carriage assembly 11 adjacent transverse control unit 15. With this arrangement both the control mechanisms 12 and 15 are immediately available to the operator of the lofting machine. Assembly 12, as best shown in Figure 9, differs mainly from assembly 15 in the construction of base 378, sprocket shaft 233', and lower cylindrical spacer bushing 303' encircling shaft 233'. Base 378 serves as a support for a vernier assembly 237' and the associated gearing mechanism, and further serves to support sprocket assembly 235'. Base 378 is secured to carriage assembly 11 by a plurality of conventional bolts 382 disposed through a lower peripheral flange 379 of base 378 and through suitable threaded openings in web 127 of carriage assembly 11. A lower cylindrical portion 380 of base 378 depends into an aperture 381 provided in assembly 11, and serves to define with the walls of base 378 thereabove a central recess 385. The lower portion of base 378 is provided with a central opening within which is press-fitted a ballbearing 260' which supports the lower end of sprocket shaft 233'. The upper end of base 378 is substantially identical to the upper portion of base 230 previously described, embodying a peripheral flange 255' for the attachment of frame 231', a cover plate 232', a worm gear 234', a handwheel 236', and a vernier mechanism 237'. Further, a cylindrical spacer bushing 303' is mounted between worm gear 234' and a collar 278'.

A pointer 299' is attached to the underside of the lower portion 380 of base 378 to permit the operator of the lofting machine to read the position of tape 27. In addition, the position of tape 27 is indicated through a mirror assembly 384, which is similar to that employed in transverse control assembly 15. Mirror assembly 384 is fitted within a recess 387 provided in web 127 and flange 126 of carriage assembly 11 and suitably held therewithin. Recess 387 communicates with an upwardly extending aperture 388 which defines a shoulder 389 for receiving a glass plate 390 which serves as a window through which the operator may view tape 27. A mirror mounting block 391 fits within recess 387, and is fixedly attached to frame 125 of carriage assembly 11 by suitable cap screws 392. The lower leftward portion of mounting block 391, as viewed in Figure 9, is angularly disposed and carries a mirror 397 so that the images of tape 27 and pointer 299' are reflected upwardly through glass window 390 to the operator.

To assure that tape 27 is securely engaged by sprocket assembly 235' an identical pair of tape idler pulleys 398 and 398' are provided. Figures 2 and 8 illustrate primarily their location and Figure 3 illustrates the construction of pulley 398 in detail. Tape idler pulleys 398 and 398' are each essentially a cylindrical element with a vertically disposed axis, each being provided with upper and lower flanges 399 to better retain tape 27 in position, and each being peripherally undercut, as at 400, to promote better engagement of teeth 298' with perforations 222. Thus, tape 27 passes around sprocket assembly 235'; around the forwardly disposed surface of idler pulley 398' and then around the rearwardly disposed surface of idler pulley 398.

Idler pulleys 398 and 398' each embody a central recess 402 within which are press-fitted a pair of bearings 405, and a shouldered cylindrical pin 406 is disposed through the bores of ball bearings 405 in close-fitting but vertically slidable relationship. The upper end of pin 406 is press-fitted into a mating aperture 407 in web 127 of frame 125, with the shoulder of pin 406 abutting against the underside of web 127. Further, pin 406 embodies at its lower end an annular flange 408 which retains the pulley on pin 406.

Tape 27 is adapted to be set and locked in position so that it may act as a gear rack. Thus travel of primary carriage assembly 11 is effected by manipulating control unit 12, causing sprocket assembly 235' to rotate and, by engaging tape 27, to move or drive assembly 11 along track assembly 10. For the purpose of initially establishing the position of assembly 11 upon assembly 10 with respect to the vertical zero datum line 225 of tape 27 a carriage lock mechanism 410, Figures 1, 2 and 8, is provided. Mechanism 410 is adapted to lock assembly 11 to longitudinal track assembly 10 with tape 27 and vernier dial 314' both set at zero, for example. Mechanism 410 is adapted to be transversely mounted on carriage assembly 11, adjacent the left end thereof, with its forwardly disposed edge substantially flush with the outer vertical face of flange 126' of the frame 125. The forward body portion of mechanism 410 is transversely slotted to provide thin upper and lower leaf members 410a and 410b, Figure 1, which by virtue of their thin section have a spring action. The lower leaf 410b is cut away to permit accommodation of the inner edge of upper way 19 of longitudinal track assembly 10, and the upper leaf 410a of mechanism 410 extends above the upper surface of the upper way 19 with a slight clearance. Locking mechanism 410 is attached to the upper surface of frame 125 of carriage assembly 11 by bolts or cap screws 417, Figure 2, which pass through suitable openings in the rearwardly disposed portion of mechanism 410 and engage threaded openings in web 127 of frame 125. An actuating or thumb screw 420 is disposed through the upper leaf of mechanism 410, and is threaded into a suitable opening in the lower leaf so that upon tightening screw 420 the upper and lower leaf members will flex and be urged toward each other and into contact with the upper and lower surfaces of upper way 19 for frictional, locking engagement therewith. Upon release of actuating screw 420, the leaves flex back to their original position, and carriage lock mechanism 410 is unlocked, permitting primary carriage assembly 11 to be moved freely with respect to longitudinal track assembly 10. It is noted that while longitudinal tape 27 is locked in position to serve as a gear rack along which carriage assembly 11 may be driven, the arrangement employed in driving the transverse or secondary carriage 14 is reversed. That is, tape 28 is not fixed as is tape 27, but instead tape 28 operates as an endless chain drive to which transverse carriage assembly 14 may be attached when desired.

As seen in Figures 1 and 10, secondary carriage assembly 14 comprises a T-shaped frame 425 which is disposed transversely across track assembly 13, and serves at one end as a mounting for a solenoid-operated center-punch mechanism 426. As will be described, provision is made for locking tape 28 to carriage 14, and for locking carriage 14 to transverse track assembly 13. Carriage assembly 14 is adapted to engage and move along track assembly 13, and three pairs of ball bearing rollers are provided to reduce friction and provide necessary support. One pair of these bearings, 429 and 429', is located adjacent the base of the stem portion of the T of frame 425, that is, to the right as viewed in Figure 10, another pair, 427 and 427', is located adjacent one end of the bar portion of T-shaped frame 425, and the third pair (not shown but substantially identical to bearings 427 and 427') is located adjacent the opposite end of the bar portion of T-shaped frame 425. In this manner, as will be seen, a three point support system is provided to minimize undesirable vertical and horizontal movement of carriage 14. A bracket assembly 430 is adapted to fasten to the outer edge of the bar portion of frame 425, the longitudinal axis of bracket assembly 430 being substantially parallel to the axis of the V-notched way 157 in transverse track assembly 13. This bracket assembly 430 serves a dual purpose, being adapted to house the two pairs of rollers 427 and 427' which engage way 157, and being further adapted to provide the mounting for punch mechanism 426. The upper portion of bracket assembly 430 is substantially rectangular in cross-section, while the lower portion thereof embodies an integral and inwardly disposed V-shaped protrusion 431 which mates with the V-shaped groove 159 in way 157. The angled faces of protrusion 431 are preferably mutually perpendicular to the angular faces of groove 159 and to each other. Protrusion 431 serves to house the two pairs of rollers 427 and 427' at different angles as shown in dotted outline in Figure 10, rollers 427 and 427' fitting within suitable recesses in protrusion 431, and being suitably mounted for rotation therein in any conventional manner. Rollers 427 and 427' in operation roll upon the surfaces of groove 159 of way 157 to promote smooth travel of assembly 14 along track assembly 13. The other pair of rollers 429 and 429' are arranged to operate one above the other and equidistant from the two pairs of rollers 427 and 427', being mounted for rotation in a pivotally mounted and spring-loaded block 435. Rollers 429 and 429' serve to engage the insulated semicylindrical way 158 of transverse track assembly 13, each roller being inclined at a forty-five degree angle. Rollers 429 and 429' also serve to provide the electrical connection between insulated way 158 and secondary carriage assembly 14 for electrically operating punch mechanism 426, as will be hereinafter described.

The main portion of block 435 is substantially rectangular and embodies integral side portions which extend beyond the main portion of block 435. The inner face of the main portion of block 435 is cut away to form a longitudinally extending V-shaped groove 438 which is adapted to fit over semicylindrical way 158, as illustrated. The rollers 429 and 429' extend through the faces of groove 438 to act against way 158, the rollers being mounted in any suitable manner for rotation within block 435.

Block 435 is adapted to be pivotally attached to a block 439 which is secured to and beneath the right-hand end of frame 425 as seen in Figure 10, block 439 being attached to frame 425 by a pair of screws 440 which pass through apertures 441 located in the end of frame 425, and which engage threaded holes 442 in the upper portion of block 439. Block 439 is made of a suitable dielectric material, such as Micarta, to insulate frame 425 from way 158 of track assembly 13, and it is centrally recessed to partially enclose block 435. One of the side extensions of block 435 is pivotally attached to block 439 by a suitable pin (not shown) which is press-fitted into appropriate openings in block 435 and block 439. Block 435, as shown, is acted upon by a plunger 448, the shank portion of which is housed within a recess 447 in block 439. The head portion of plunger 448 is rounded and urged against the right hand face of block 435 by a compression spring 449 which is adapted to fit within recess 447 about the shank portion of plunger 448. This action of plunger 448 against block 435 causes block 435 to pivot inwardly, pivoting about the pin through blocks 435 and 439, so that rollers 429 and 429' bear firmly against the semicylindrical surface of the insulated way 158 of track assembly 13. It is noted that the disposition of block 435 within block 439 is sufficiently close-fitting that undesirable vertical movement of block 435, and hence rollers 429 and 429' is minimized.

As shown in Figure 10, a tape locking mechanism 450 is mounted to secondary carriage assembly 14 and serves to lock assembly 14 to tape 28 so that carriage 14 may be driven along transverse track assembly 13 by tape 28. In addition, there is also mounted to assembly 14 a carriage locking mechanism 451 for locating and locking carriage 14 on tape 28. Mechanism 450 and mechanism 451 are substantially identical and are associated with a block 452 which depends from frame 425 and is secured to the underside thereof by a plurality of cap screws 453 which pass through a corresponding number of apertures 454 in frame 425 and engage mating, threaded recesses 455 in block 452. Block 452 is generally as wide as the central portion of frame 425 and is substantially enclosed between the side rails 153 of assembly 13 and above the base 151 of assembly 13. The upper central portion of block 452 is provided with a rectangular recess or groove 457 which extends from right to left, and the lower right and left hand portions of block 452 are provided with slots or grooves 459 and 460, at right angles to and communicating with groove 457.

The principal component of each of the locking mechanisms 450 and 451 is an L-shaped lever or bellcrank 462 which is approximately the width of groove 457 and is adapted to be pivotally mounted in block 452. As illustrated, the horizontally disposed upper portion of bellcrank 462 for mechanism 450 is enclosed within groove 457 and extends inwardly toward the center of block 452, and the lower portion of bellcrank 462 passes downwardly into groove 459. This lower portion of bellcrank 462 embodies an integral locking face 463 which is adapted to contact and clamp tape 28 against the outer vertical and unyielding face of groove 459 of block 452. Pivotal attachment of bellcrank 462 to block 452 is effected through a dowel pin 464 press-fitted through a suitable aperture in bellcrank 462 and rotatably disposed through opposed openings in block 452.

Actuation of tape locking mechanism 450 is effected by manual rotation of a shouldered actuating screw 467 which is threadably disposed through an opening 468 in frame 425 and into engagement with the upper surface of bellcrank 462 adjacent its inwardly disposed end. Bellcrank 462 is normally biased against actuating screw 467 by a spring 470 which is located in block 452 in a recess 469 which is vertically aligned with aperture 468 in frame 425. Thus, rotation of actuating screw 467 in one direction depresses the inwardly disposed end of bellcrank 462 against the bias of spring 470, causing face 463 of bellcrank 462 to clamp tape 28 against the locking surface of block 452 which is formed by groove 459. Rotation of actuating screw 467 in the opposite direction releases the clamping action against tape 28 since spring 470 exerts its bias to move bellcrank 462 upwardly.

Carriage locking mechanism 451 embodies a similar actuating screw 467 which is adapted to act against a similar bellcrank 462', against the bias of a similar spring 470' in a recess 469', rotating bellcrank 462' about a pin 464' to move face 463' of bellcrank 462' against the internal face of side rail 153 of track assembly 13. The engagement of face 463' against rail 153 serves to lock carriage assembly 14 in position on transverse track assembly 13. Upon return movement of screw 467' movement is permitted of the components of mechanism 451' to their unlocked position, as illustrated in Figure 10, so that carriage assembly 14 may travel freely over track assembly 13 as desired.

Solenoid-operated centerpunch mechanism 426, best shown in Figure 10, is also associated with transverse carriage assembly 14, being secured to bracket assembly 430, which in turn is attached to assembly 14 by cap screws 472. Screws 472 pass through apertures 473 in bracket 430 and engage threaded openings 474 in frame 425. A projection 476 of assembly 430 embodies a rounded cut out or recess 477 whose wall defining portions serve, together with a curved clamping member 478, to hold punch mechanism 426. Member 478 is hinged at one side to the outward end of projection 476, and is provided at its other side with a slot 484. An eyebolt 485 is pivotally secured in slot 484 by a pin 486 which is disposed through suitable openings in eyebolt 485 and projection 476, eyebolt 485 being provided with a shouldered knob 487 which is adapted, upon closure of clamping member 478 to be threadably advanced inwardly. A slot 490 is provided in clamping member 478 opposite slot 484 in projection 476 so that, upon closure of member 478, eyebolt 485 may be pivoted to seat in slot 490. Tightening of knob 487 will then act against clamping member 478, urging member 478 against projection 476 and locking punch mechanism 426 in position therebetween.

Referring to Figure 15, centerpunch mechanism 426 comprises a body portion 491 which is adapted to be held in position between projection 476 and clamping member 478, portion 491 embodying a pair of spaced flanges 492 and 493, which engage the edges of member 478 to limit vertical movement of centerpunch mechanism 426, and a pair of spaced flanges 495 which serve as precision surfaces against which clamping member 478 acts. Body 491 of punch mechanism 426 is centrally bored to rigidly accommodate a tubular element or sleeve 496 which serves to slidably receive a vertically disposed cylindrical shaft 498. Shaft 498 extends upwardly above sleeve 496, and carries upon its upper end a washer 499 against which a spring 501 acts, spring 501 being disposed about shaft 498 and exerting its bias against sleeve 496 and washer 499 to urge shaft 498 upwardly. A plate 502, centrally apertured to permit shaft 498 and spring 501 to pass therethrough, is secured to flange 492 by cap screws 504, and serves to carry a bracket 505 which is welded to its upper surface. Bracket 505 in turn serves to support a conventional solenoid 506 at its upper end, and a yoke 507 is connected to the armature of solenoid 506 and extends downwardly into contact with circular plate 499. A cylindrical cover 508 serves as a housing, as illustrated, for plate 502, bracket 505, solenoid 506 and yoke 507, being secured to plate 502 by machine screws 509. In this construction, energization of solenoid 506 causes a downward stroke of the armature of solenoid 506, and this movement is transmitted by yoke 507 to plate 499 to urge shaft 498 downwardly. Spring 501 acts to move shaft 498 upwardly upon de-energization of solenoid 506. A flexible lead 510, Figure 1, passes into housing 508, providing power for solenoid 506.

A punch point 516 is connected to the lower end of shaft 498 by a nut 519 which is threaded to shaft 498 and acts against a suitable shoulder (not shown) of point 516 to secure point 516 in position. Nut 519 also serves to secure in position a cylindrical rubber sleeve 518 which fits about point 516. Further, a block 520, which is fitted about the lower end of tubular sleeve 496 and secured in position by a screw 521, pivotally carries an L-shaped arm 524 in a suitable slot (not shown) provided in block 520 opposite screw 521. Arm 524 pivots about a pin 525 which is press-fitted in suitable openings in arm 524 and block 520, and a U-shaped torsion spring 526, secured at its ends about pin 525, is looped over the outside of arm 524. A pin 527, horizontally disposed through block 520 below pin 525, serves to pre-load the torsion spring 526 so that when arm 524 is pivoted outwardly, spring 526 exerts a bias tending to move arm 524 inwardly. An L-shaped block 528, which serves as a stamp pad holder, is pivotally attached to the lower end of arm 524, pivoting about a pin 531, and carries a suitable stamp pad in a suitable recess therefor. Block 528 is also pivotally attached by a pair of links 532 to shaft 498, links 532 being pivotable about a pin 533 in block 528 and about a pair of pins 534 in shaft 498. Only the near one of pins 534 and links 528 is illustrated in Figure 15, and the stamp pad mechanism can be seen in its normaly closed position with block 528 in alignment with punch point 516, and the lower end of the tubular rubber sleeve 518 thrust into the inked stamp pad 536 so that its lower surface may be inked. It will be apparent that when shaft 498 is urged downwardly upon energization of solenoid 506, block 528 pivots about pin 531 until point 516 is in position to pivotally clear block 528, and then links 532 effect a pivotal movement of block 528 away from shaft 498. Punch point 516 can then make a punch indentation on the loft board surface 57, and tubular rubber sleeve 518 simultaneously contacts the loft board surface 57 and imprints a stamped circle about the punched indentation for rapid identification of lofted points.

To illuminate tape 27 positioned on longitudinal track assembly 10 to enable it to be viewed readily through window 390 there is provided a lamp assembly 550. Power for lamp assembly 550 is taken from side way 25' which is connected by way of socket 119 to transformer 118. As shown in Figures 3 and 8, power is conducted from side way 25' through center roller 131' to an electrically conductive strip 540 fastened to the underside of boss 129 of carriage assembly 11. A contact shoe 541 integral with strip 540 is engaged by center roller 131' which, as has been described, is pivotally mounted in insulated block 140 and rides on side way 25'.

Conductor strip 540 is electrically insulated from frame 125 of carriage assembly 11 by a strip of dielectric material 542, such as Micarta, located interjacent strip 540 and frame 125, a portion of strip 542 having been deleted in Figure 8 for clarity. Strip 540 is insulatably fastened to the underside of frame 125 by a plurality of screws 545 which are insulated in any suitable manner from strip 540, as by an insulating washer 544, Figure 11. Strip 540 supplies current to the lamp assembly 550 housed in frame 125 and employed for illuminating tape 28.

Lamp assembly 550 is housed in an aperture 547, Figures 2 and 8, provided in web 127 of frame 125, and includes a socket block 549 which is pivotally mounted in aperture 547. Block 549 embodies an integral flange which fits upon an internal shoulder (not shown) of aperture 547 and a plate 553 is disposed over block 549 and secured to base 125 by a screw 554 so that block 549 is maintained in position. Lamp assembly 550 is secured within an aperture 555 in block 549. The base of lamp assembly 550 is in electrical contact with a suitable downwardly depending flange (not shown) of strip 540, and a spring clip 557 connecting block 549 to frame 125 helps to maintain block 549 in position and also serves to provide a grounded electrical connection between block 549 and frame 125.

Illumination of tape 28 carried by transverse track assembly 13 will now be described. As shown in Figure 3 usual bulbs 575 (only one of which is shown) are disposed on transverse control unit 15 and direct light upon such tape. Power for bulbs 575 is derived from conductive strip 540 (described in connection with Figure 8).

An annulus or annular spacer 560 (Figures 3 and 8) fabricated of a dielectric material such as Micarta, is fastened to the upper surface of the central portion of frame 125 of the primary carriage assembly by any suitable means such as screws (not shown), annulus 560 serving to insulate strip 540 from frame 125 in the electrical circuit between strip 540 and the illuminating means carried by transverse control unit 15. A short electrical contact plate 562 (Figure 8) is fastened at one end by a screw 563 to the upper surface of dielectric annulus 560 in one of the two regions where annulus 560 traverses conductor strip 540, and the other end of contact plate 562 is electrically connected to conductor strip 540 by an electrically conductive machine screw (not shown). This screw is disposed through contact plate 562, through annulus 560, through an insulating or dielectric collar (not shown) disposed through boss 129 of frame 125, and thence through suitable openings in insulator strip 542 and conductor strip 540, a conventional nut being threaded to the end of the conductive screw for securement thereof to strip 540. By this construction the screw is electrically insulated from frame 125 of carriage assembly 11, and yet electrical energy is afforded passage from conductor strip 540 to contact plate 562.

The pair of bulb means 575 positioned on transverse control unit 15 for illuminating tape 27 are fitted into a pair of usual metal sockets (not shown) which are suitably mounted within apertures 569 provided in base 230. The rearward openings of apertures 569 are closed by a block 576, secured to base 230 by a screw 585, made of a suitable insulating material such as Micarta. Suitable electrical leads (not shown) interconnect the sockets of bulbs 575 and a metal finger 581 on the rear of block 576. Finger 581 is electrically connected to a metallic conductor strip 579 which is attached to the lower surface of block 576 by machine screws 580. Strip 579 receives power through an electrical connection with contact plate 562 (Figure 8) afforded by a finger or spring like member (not shown) which is integral with strip 579 and which is pre-sprung so that it is normally in electrical contact with contact plate 562.

Electrical energy for the operation of punch mechanism 426 is also taken from primary conductor strip 540, this time by way of semi-cylindrical way 158 carried by transverse track assembly 13. The electrical connection between strip 540 and way 158 will now be described. As shown in Figure 8 the right-hand end of primary conductor strip 540 is L-shaped, and extends across the underside of frame 125 to a normally open push-button switch 589 whose insulated shell is fitted into a suitable aperture in web 127 of frame 125. A wire lead 591 suitably connects conductor strip 540 to one of the terminal posts of push-button switch 589, and the other terminal post of switch 589 is connected by a wire lead 592 to the right-hand end of a secondary metallic conductor strip 593 which extends longitudinally along the underside of web 127 of frame 125, and which is electrically insulated from frame 125 by a strip 594 of dielectric material such as Micarta. A contact plate 562', identical to the contact plate 562 heretofore described is fastened at one end by a machine screw 563' to the upper surface of dielectric annulus 560 in the region where annulus 560 traverses the left-hand end of conductor strip 593. At the other end plate 562' is electrically connected to conductor strip 593 by employing a construction identical to that previously described. Thus, a machine screw 564', Figures 8 and 11, electrically connects plate 562' with conductor strip 593, screw 564' passing through contact plate 562', dielectric annulus 560, web 127 of frame 125, dielectric strip 594, and conductor strip 593, and being retained by nut 568'. A tubular bushing 567', fabricated of a dielectric material such as Micarta and pressed into a vertical aperture 566' in web 127, serves to electrically insulate screw 564' from web 127. Contact plate 562' is electrically connected to semicylindrical way 158 of track assembly 13 by an L-shaped metallic conductor strip 595 which is fastened to way 158 of track assembly 13 by a machine screw 596. A block 597, fabricated of a dielectric material such as Micarta, is interposed between the vertical portion of strip 595 and track assembly 13 to insulate strip 595 from assembly 13, strip 595 being secured to the lower surface of block 597 by a machine screw 598. It is noted that screw 596 carries power between way 158 and strip 595, and also retains block 597 in position.

Depression of the operating portion of switch 589 completes the circuit between conductor strips 540, 593 and 595 to furnish current to way 158 for operation of punch mechanism 426', the circuit from way 158 to punch mechanism 426 will next be described. As best illustrated in Figure 10, rollers 429 and 429' in block 435 are in the electrical path between way 158 and carriage assembly 14 which carries punch mechanism 426. Electrical energy is transmitted from way 158 through rollers 429 and 429' to their supporting block 435, which block 435, as previously described, is electrically insulated from frame 425 of carriage assembly 14. An L-shaped metallic conductor strip 602 has its vertical portion extending between the opposing faces of blocks 435 and 439, and this portion is pre-sprung to bear against the outwardly disposed face of hinged block 435 to pick up electrical energy therefrom. The horizontal portion of strip 602 is fastened to the lower surface of block 439 by screws 603.

Frame 425, Figures 1 and 10, of transverse carriage assembly 14 embodies a vertical opening 604 into which a bayonet-type socket 606 is pressed to effect electrical connection between socket 606 and frame 425. At one end the socket 606 has its terminal post connected to conductor strip 602 by a wire lead 607, and at the other end socket 606 receives a male bayonet-type plug 609, which is electrically connected to flexible lead 510 of punch mechanism 426 so that the electrical connection between centerpunch mechanism 426 and carriage assembly 14 is completed. Since no separate switching element is employed in punch mechanism 426, activation of the normally open push-button switch 589 on carriage assembly 11 causes current to flow into way 158, through rollers 429 and 429', through hinged block 435, through conductor strip 602 and lead 607 to socket 606 and plug 609, and through lead 510 to solenoid 506 to operate punch mechanism 426.

In the electrical system embodied in the present form of the invention, as thus described, it is noted that the use of entangling wires or cables is minimized.

Figures 1 and 16 illustrate an alignment and leveling device 610 employed in the present invention. In Figure 1 the device 610 is shown applied to longitudinal track assembly 10. Although but one device 610 is illustrated it is contemplated that two of these devices may be employed, one at either end of longitudinal track assembly 10. Leveling accessory 610 serves to indicate whether or not side way 25 of assembly 10 is parallel to a predetermined line drawn on the surface of the loft board, and in this way the operational axes of the lofting machine may be coordinated with prior work. Accessory 610 serves to detect any twist in track assembly 10, leveling screws 115 being provided to compensate for any such twist which may exist.

Accessory 610 comprises a tripod assembly 612 which is adapted to receive a microscope assembly 613 thereon, assembly 612 also carrying a spirit level 614 upon its upper surface. Tripod assembly 612 includes a base 615, a pair of forward feet 616, only one of which is illustrated, and a rearward foot 617, feet 616 being secured to base 615 by a plurality of cap screws 618, and foot 617 being secured to base 615 by a plurality of capscrews 620.

Feet 616 and 617 are adapted to rest on the upper surfaces of lower ways 20 of track assembly 10, and feet 616 each embodies a horizontally disposed bore 622 which serves to securely receive a button 623 which is adapted to slidably abut against the inner face of side way 25.

In order to lock the alignment and leveling accessory 610 to assembly 10 at any desired location, foot 617 embodies a slotted recess 626 which serves to pivotally receive a locking element or clamp 627 which pivots about a pin 628. An actuating screw 629 is threaded through base 615 and projects into abutment against clamp 627, so that screw 629 may be operated or rotated to pivot clamp 627 against upper way 19 to lock accessory 610 in position, the locked position of clamp 627 being illustrated in phantom outline. Clamp 627 is normally biased away from upper way 19 by a flat spring 631 which is suitably attached to the lower surface of base 615 by screws 632.

Spirit level 614 is adjustably attached to the upper surface of tripod 612, being adjusted in elevation by manipulating a pair of spaced externally threaded studs 636 which are suitably secured to tripod base 615 and level 614, as illustrated. Thus, level assembly 614 may be employed, upon installation of accessory 610 in the longitudinal track assembly 10, to indicate whether or not track assembly 10 is level.

A clamping mechanism is provided at the forward end of accessory 610 to mount microscope assembly 613, the mechanism being substantially identical to the clamping mechanism employed on transverse carriage assembly 14 for holding punch mechanism 426 in position. Thus, a block 640 attached to base 615 is adapted to pivotally carry a clamping element 478' to permit microscope assembly 613 to be mounted or dismounted, as desired. It is noted that since two identical alignment and leveling accessories 610 may be employed to set the present lofting machine parallel to some existing reference line on the loft board, each accessory 610 should be adapted to clamp its corresponding microscope assembly 613 at identical distances from side way 25 in track assembly 10.

A microscope 643, slidably housed within a tubular housing 644 which is held by clamping element 478', serves to provide magnification as desired. It is noted that housing 644 may, if desired, be made of a diameter such that assembly 613 may be employed interchangeably with centerpunch mechanism 426 on transverse carriage assembly 14. Housing 644 is externally threaded at 645 and provided with collet slots 647 so that upon tightening of a threaded nut 649 a locking action will be effected which will hold microscope 643 at a desired height with respect to tubular housing 644. With this construction tubular housing 644 may be lowered to rest on the surface of the loft board or drawing and clamped in position, and microscope 643 adjusted for proper focus and locked in position by nut 649. Further, when microscope assembly 613 is employed interchangeably with centerpunch mechanism 426 on carriage assembly 614, assembly 613 is useful for locating any previously marked points, viewing or rechecking previous work, and resetting tapes 27 and 28 to existing points.

As thus described, the lofting machine of the present invention is adapted to accurately and rapidly measure coordinate points in relation to established datum lines, and precisely plot and mark such points for the definition, for example, of a curved or contoured line. In addition, the present machine serves to measure the coordinates of already established points for recording.

In the operation of the lofting machine of the present invention, the machine is first rolled into position over some known or predetermined longitudinal axis and zero point from which other points are to be measured, for example. Then retractable swivel caster and housing assemblies 30 and 30' are operated so that each of the tires 45 thereof is raised, and vacuum cups 99 are actuated to secure the lofting machine in position on the loft board.

Leveling devices 610 are employed to level the machine and insure that it is parallel to the predetermined longitudinal axis, transverse adjustment mechanisms 33 and 33' being operated as required. Then, control assemblies 12 and 15 are operated to bring carriage assembly 11 in position over the predetermined zero point, as viewed through microscope assembly 613 mounted to carriage assembly 14, and carriage lock mechanism 410 is next operated to lock carriage assembly 11 to track assembly 10. Control assembly 12 is again operated, with tape locking mechanism 31 in its released position, to bring the zero point of tape 27 into view within window 390 of control assembly 12. Mechanism 31 is then locked and mechanism 410 is released, the longitudinal disposition of the lofting machine now being properly established.

Tape locking mechanism 450 of carriage assembly 14 is released, carriage locking assembly 451 is locked, and control assembly 15 is then operated until the zero point of tape 28 is brought into view within window 249 of assembly 15. Next, locking assembly 451 is released and tape locking mechanism 450 is locked, the transverse disposition of the lofting machine now being properly established.

To locate a point having a longitudinal or X-axis coordinate of 12 inches, and a transverse or Y-axis coordinate of 15 inches, for example, centerpunch mechanism 426 is substituted for microscope assembly 613 in transverse carriage 14, and control assemblies 12 and 15 are operated until 12 inches and 15 inches are indicated in windows 390 and 249, respectively. Switch 589 is then depressed to actuate centerpunch mechanism 426, and the desired point is permanently recorded on the loft board surface. Successive points are located and recorded in a similar manner.

While certain preferred embodiments of the invention have been specifically disclosed it is understood that the invention is not limited thereto as many variations will be readily apparent to those skilled in the art and the invention is to be given its broadest possible interpretation within the terms of the following claims.

What we claim is:

1. A drafting machine comprising a primary track, movable primary endless means having first position indicia thereon and normally fixedly carried by said primary track, a primary carriage movable along said primary track, a secondary track mounted upon said primary carriage, secondary endless means having second position indicia thereon and movably carried by said secondary track, a secondary carriage normally fixedly engaged with said secondary endless means and actuable thereby for movement along said secondary track, a primary control in operative engagement with said primary endless means and mounted on said primary carriage for effecting movement of said primary carriage along said primary track, and a secondary control mounted on said secondary track and in operative engagement with said secondary endless means for effecting movement of said secondary endless means, said first position indicia and said second position indicia serving to indicate the moved positions, respectively, of said primary carriage and said secondary carriage.

2. A lofting machine for locating the coordinates of a point, said machine comprising a longitudinal track, movable primary endless means having longitudinal coordinate indicia thereon and normally fixedly carried by said longitudinal track, a primary carriage movable along said longitudinal track, a transverse track mounted upon said primary carriage, secondary endless means having transverse coordinate indicia thereon and movably carried by said transverse track, a secondary carriage normally fixedly engaged with said secondary endless means and actuable thereby for movement along said transverse track, a primary control in operative engagement with said primary endless means and mounted on said primary carriage for effecting movement of said primary carriage along said longitudinal track to establish the longitudinal coordinate of said point and, a secondary control mounted on said transverse track and in operative engagement with said secondary endless means for effecting movement of said secondary endless means to establish the transverse coordinate of said point, said longitudinal coordinate indicia and said transverse coordinate indicia serving to indicate the moved positions, respectively, of said primary carriage and said secondary carriage.

3. A drafting machine comprising a longitudinally extending main runway, a primary carriage movable along said main runway, a transverse runway pivotably mounted upon said primary carriage and normally perpendicularly disposed to said main runway, disconnectable means mounted between said transverse runway and said primary carriage for normally maintaining the perpendicularity of said transverse runway and disconnectable to permit said transverse runway to be pivoted into substantial alignment with said main runway, a secondary carriage movable along said transverse runway, a primary motive means for effecting movement of said primary carriage, a secondary motive means for effecting movement of said secondary carriage, a plurality of wheel means for rendering said drafting machine mobile, certain of said wheel means being adapted for retraction to render said drafting machine immobile, and means for adjusting the transverse position of said main runway when said wheel means are retracted.

4. A drafting machine comprising a longitudinally extending main track, a primary endless tape carried by said main track, primary tape lock means mounted on said main track and having a locked position for restraining said primary endless tape against movement relative to said main track, a primary carriage movable along said main track, a transversely extending secondary track mounted upon said primary carriage, a secondary endless tape carried by said secondary track, a secondary carriage movable by said secondary endless tape along said secondary track, secondary tape lock means mounted on said secondary carriage and having a locked position for restraining said secondary endless tape against movement relative to said secondary carriage, a primary control in engagement with said primary endless tape and mounted on said primary carriage for effecting movement of said primary carriage along said main track when said primary tape lock means are in a locked position, and a secondary control in engagement with said secondary endless tape and mounted on said secondary track for effecting movement of said secondary carriage when said secondary tape lock means are in a locked position.

5. A drafting machine comprising a longitudinally extending main track, a primary endless tape carried by said main track, primary tape lock means mounted on said main track and having a locked position for restraining said primary endless tape against movement relative to said main track, a primary carriage movable along said main track, a transversely extending secondary track mounted upon said primary carriage, a secondary endless tape carried by said secondary track, a secondary carriage movable by said secondary endless tape along said secondary track, secondary tape lock means mounted on said secondary carriage and having a locked position for restraining said secondary endless tape against movement relative to said secondary carriage, a primary control in engagement with said primary endless tape and mounted on said primary carriage for effecting movement of said primary carriage along said main track when said primary tape lock means are in a locked position; primary carriage lock means for restraining said primary carriage against movement relative to said main track, and secondary carriage lock means for restraining said secondary carriage against movement relative to said secondary track.

6. A drafting machine comprising a main track, an electrically conductive rail insulatably carried by said main track, a primary carriage movable along said main track, a primary electrically conductive contact element insulatably carried by said primary carriage and adapted for moving contact with said rail, electrically conductive means insulatably carried by said primary carriage and electrically coupled to said primary contact element, a secondary track mounted upon said primary carriage, an electrically conductive way insulatably carried by said secondary track and adapted to be electrically coupled to said electrically conductive means, a switching element for making and breaking the circuit through said electrically conductive way, a secondary carriage movable along said secondary track, an electrically conductive secondary contact element insulatably carried by said secondary carriage and adapted for moving contact with said way, solenoid means carried by said secondary carriage which is adapted upon electrical energization to record the location of a point, and an electrically conductive means insulatably carried by said secondary carriage and electrically coupled to said secondary contact element and to said solenoid means whereby current may be provided for operation of said solenoid means.

7. A drafting machine comprising a primary track, an electrically conductive rail insulatably carried by said primary track, primary endless means carried by said primary track, a primary carriage movable along said primary track, a primary electrically conductive roller insulatably carried by said primary carriage and adapted for rolling contact with said rail, electrically conductive means insulatably carried by said primary carriage and electrically coupled to said primary roller, a secondary track mounted upon said primary carriage, an electrically conductive way insulatably carried by said secondary track and adapted to be electrically coupled to said electrically conductive means, a switching element for making and breaking the circuit through said electrically conductive way, secondary endless means carried by said secondary track, a secondary carriage normally fixedly engaged with said secondary endless means and actuable thereby for movement along said secondary track, a primary control in operative engagement with said primary endless means and mounted on said primary carriage for effecting movement of said primary carriage along said primary track, a secondary control mounted on said secondary track and in operative engagement with said secondary endless means for effecting movement of said secondary endless means, an electrically conductive secondary roller insulatably carried by said secondary carriage and adapted for rolling contact with said way, solenoid means carried by said secondary carriage which is adapted upon electrical energization to record the location of a point, and an electrically conductive means insulatably carried by said secondary carriage and electrically coupled to said secondary roller and to said solenoid means whereby current may be provided for operation of said solenoid means.

8. A lofting machine for locating the coordinates of a point, said machine comprising a longitudinal track, primary endless means releasably carried by said longitudinal track, a primary carriage movable along said longitudinal track, a transverse track mounted upon said primary carriage and perpendicularly disposed to said longitudinal track, means mounted between said transverse track and said primary carriage for maintaining the perpendicularity of said transverse track to said longitudinal track, secondary endless means carried by said transverse track, a secondary carriage movable along said transverse track and releasably engaged with said secondary endless means, a primary control mounted upon said primary carriage and in engagement with said primary endless means for effecting movement of said primary carriage along said longitudinal track to establish the longitudinal coordinate of said point, a secondary control mounted upon said transverse track and in engagement with said secondary endless means for effecting movement of said secondary carriage, when said secondary carriage is in engagement with said secondary endless means, to establish the transverse coordinate of said point, means carried by said secondary carriage for effecting the recording of the location of said point, a plurality of wheel means for rendering said lofting machine mobile, certain of said wheel means being adapted for retraction to render said lofting machine immobile, suction means operable for securing said lofting machine in position when said wheel means are retracted, and means for adjusting the transverse position of said longitudinal track when said wheel means are retracted and said suction means are operated.

9. A drafting machine comprising a longitudinally extending main track, primary endless means carried by said main track, a primary carriage movable along said main track, a secondary track mounted upon said primary carriage, secondary endless means carried by said secondary track, a secondary carriage actuable by said secondary endless means for movement along said secondary track, a primary control in engagement with said primary endless means and mounted on said primary carriage for effecting movement of said primary carriage along said main track, a secondary control in operative engagement with said secondary endless means for effecting movement of said secondary endless means, a plurality of wheel means for rendering said drafting machine mobile, certain of said wheel means being adapted for retraction to render said drafting machine immobile, and means for adjusting the transverse position of said main track when said wheel means are retracted.

References Cited in the file of this patent

UNITED STATES PATENTS

| | | |
|---|---|---|
| 1,247,867 | Oltman | Nov. 27, 1917 |
| 1,370,645 | Hawkes | Mar. 8, 1921 |
| 1,615,668 | Anderson | Jan. 25, 1927 |
| 2,083,490 | Boker | June 8, 1937 |
| 2,353,726 | Guttmann | July 18, 1944 |
| 2,420,835 | Morrison | May 20, 1947 |
| 2,469,129 | Reimann | May 3, 1949 |
| 2,549,634 | Parsons | Apr. 17, 1951 |
| 2,566,247 | Pierce et al. | Aug. 28, 1951 |
| 2,566,875 | Dietrich et al. | Sept. 4, 1951 |
| 2,570,275 | Reading | Oct. 9, 1951 |
| 2,583,578 | Lowndes | Jan. 29, 1952 |
| 2,618,860 | Englehart | Nov. 25, 1952 |
| 2,627,673 | Droz | Feb. 10, 1953 |
| 2,628,539 | De Neergaard | Feb. 17, 1953 |
| 2,686,099 | Bomberger et al. | Aug. 10, 1954 |

FOREIGN PATENTS

| | | |
|---|---|---|
| 575,028 | France | Apr. 11, 1924 |
| 438,807 | Germany | Dec. 28, 1926 |
| 492,472 | Germany | Feb. 21, 1930 |